(12) United States Patent
Arai et al.

(10) Patent No.: US 10,362,266 B2
(45) Date of Patent: Jul. 23, 2019

(54) VIDEO PROCESSING APPARATUS, VIDEO PROCESSING SYSTEM, AND VIDEO PROCESSING METHOD

(71) Applicant: SONY CORPORATION, Tokyo (JP)

(72) Inventors: Hideki Arai, Kanagawa (JP);
Sensaburo Nakamura, Kanagawa (JP);
Atsushi Nakayama, Kanagawa (JP);
Tsutomu Miyauchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/552,531

(22) PCT Filed: Feb. 12, 2016

(86) PCT No.: PCT/JP2016/000730
§ 371 (c)(1),
(2) Date: Aug. 22, 2017

(87) PCT Pub. No.: WO2016/139898
PCT Pub. Date: Sep. 9, 2016

(65) Prior Publication Data
US 2018/0035076 A1 Feb. 1, 2018

(30) Foreign Application Priority Data
Mar. 5, 2015 (JP) .................. 2015-043556

(51) Int. Cl.
*H04N 5/93* (2006.01)
*G11B 27/00* (2006.01)
(Continued)

(52) U.S. Cl.
CPC ......... *H04N 7/0117* (2013.01); *G11B 27/031* (2013.01); *G11B 27/10* (2013.01);
(Continued)

(58) Field of Classification Search
USPC ............... 386/278, 280, 282, 232, 239, 248
See application file for complete search history.

(56) References Cited

U.S. PATENT DOCUMENTS 5,974,219 A * 10/1999 Fujita ................ G06F 17/30825
348/E5.067
9,047,517 B2 * 6/2015 Demizu ............ G08B 13/19671
(Continued)

FOREIGN PATENT DOCUMENTS

| JP | 2005-223487 A | 8/2005 |
| JP | 2005-260753 A | 9/2005 |

(Continued)

OTHER PUBLICATIONS

International Search Report and Written Opinion of PCT Application No. PCT/JP2016/000730, dated Apr. 26, 2016, 02 pages of English Translation and 09 pages of ISRWO.

*Primary Examiner* — Daquan Zhao
(74) *Attorney, Agent, or Firm* — Chip Law Group

(57) ABSTRACT

This apparatus includes: a video input unit that inputs a first video signal captured at a first frame resolution by a camera, to which a time data item of each frame has been added; a video storage unit that stores the first video data item of each frame of the first video signal in association with the time data item; a position information input unit that receives a position information item of a particular moving object included in the first video signal as a part of a subject; a position information storage unit that stores the received position information item in association with a time; and a controller that reads, from the position information storage unit, the one or more position information items for each particular time interval, calculates a cut region including one or more positions respectively indicated by these information items, cuts the video data item of the cut region from the (Continued)

first video data item of the time interval, and generates the second video data item having the second frame resolution.

18 Claims, 18 Drawing Sheets

(51) Int. Cl.
| | |
|---|---|
| *H04N 7/01* | (2006.01) |
| *H04N 5/232* | (2006.01) |
| *H04N 5/262* | (2006.01) |
| *H04N 7/18* | (2006.01) |
| *G11B 27/031* | (2006.01) |
| *G11B 27/10* | (2006.01) |
| *H04N 5/14* | (2006.01) |
| *H04N 7/015* | (2006.01) |
| *H04N 5/77* | (2006.01) |
| *H04N 5/781* | (2006.01) |
| *H04N 21/433* | (2011.01) |
| *H04N 21/4402* | (2011.01) |
| *H04N 21/45* | (2011.01) |
| *H04N 9/80* | (2006.01) |

(52) U.S. Cl.
CPC ............. *H04N 5/144* (2013.01); *H04N 5/232* (2013.01); *H04N 5/262* (2013.01); *H04N 5/77* (2013.01); *H04N 5/781* (2013.01); *H04N 7/015* (2013.01); *H04N 7/18* (2013.01); *H04N 7/181* (2013.01); *H04N 21/4334* (2013.01); *H04N 21/440245* (2013.01); *H04N 21/4524* (2013.01)

(56) References Cited

U.S. PATENT DOCUMENTS

| | | | |
|---|---|---|---|
| 2004/0001697 A1* | 1/2004 | Kambayashi | G11B 19/02 386/353 |
| 2004/0012578 A1* | 1/2004 | Naegle | G09G 5/12 345/204 |
| 2012/0087640 A1 | 4/2012 | Kitamura et al. | |

FOREIGN PATENT DOCUMENTS

| | | |
|---|---|---|
| JP | 2009-272970 A | 11/2009 |
| JP | 2012-084979 A | 4/2012 |

* cited by examiner

VIDEO PROCESSING APPARATUS, VIDEO PROCESSING SYSTEM, AND VIDEO PROCESSING METHOD

CROSS REFERENCE TO RELATED APPLICATIONS

This application is a U.S. National Phase of International Patent Application No. PCT/JP2016/000730 filed on Feb. 12, 2016, which claims priority benefit of Japanese Patent Application No. JP 2015-043556 filed in the Japan Patent Office on Mar. 5, 2015. Each of the above-referenced applications is hereby incorporated herein by reference in its entirety.

TECHNICAL FIELD

The present technology relates to a video processing apparatus and more particularly to a video processing apparatus that cuts at least a partial region from a first video signal obtained by capturing a video of a sporting event or the like with a camera and outputs a second video signal, a video processing system, and a video processing method.

BACKGROUND ART

There has been known a technology of automatically generating a video of a new camera work from a video including a moving object as a part of a subject, such as a sports video. For example, Patent Literature 1 has disclosed the following digital camera work apparatus. In this digital camera work apparatus, a sports video is input. Movement information of each player is detected from the input sports video. On the basis of respective positions of each player over a plurality of frames, which is included in the movement information of each player, a region which is most crowded with the respective players and in which each player is largely moving is determined. It is set as a frame position of a video of a new camera work. In addition, the video of the new camera work is cut from the sports video on the basis of the set frame position and the cut video is output. Further, in accordance with Patent Literature 1, a position of a ball is detected from the sports video and the frame position is calculated considering the detected position of the ball.

CITATION LIST

Patent Literature

Patent Literature 1: Japanese Patent Application Laid-open No. 2005-223487 (paragraphs [0006] and [0010])

DISCLOSURE OF INVENTION

Technical Problem

However, a camera processing system of this type still has many problems that should be functionally improved.

Solution to Problem

In order to solve the above-mentioned problems, a video processing apparatus of an embodiment according to the present technology includes a video input unit, a video storage unit, a position information input unit, a designation start time storage unit, a designation end time storage unit, and a controller.

The video input unit is configured to input a first video signal captured at a first frame resolution by a camera, to which a time data item of each frame has been added.

The video storage unit is configured to store a first video data item of each frame included in the input first video signal in association with the time data item.

The position information input unit is configured to receive a position information item of a particular moving object included in the first video signal as a part of a subject.

The position information storage unit is configured to store the received position information item in association with a time.

The designation start time storage unit is configured to store a time that specifies a start of a time interval.

The designation end time storage unit is configured to store a time that specifies an end of the time interval.

The controller is configured to read, from the position information storage unit, one or more position information items for each time interval specified by the designation start time storage unit and the designation end time storage unit, calculate a cut region including one or more positions respectively indicated by the one or more read position information items, cut a video data item of the cut region from the first video data item of the time interval which has been stored in the video storage unit, and generate a second video data item having a second frame resolution from the cut video data item.

The video processing apparatus of an embodiment according to the present technology has such a configuration. Therefore, the second video data item having the second frame resolution, which is obtained by cutting, from the frame of the first video signal having the first frame resolution, the region including the one or more positions of the moving object in the time interval, can be continuously generated for each time interval. With this, it is possible to automatically generate, on the basis of the first video signal of the entire object which is captured by the one camera, second video data items of the picture frame at various positions and with various sizes.

Further, in this video processing apparatus, the position information input unit receives, from an outside, the position information item of the particular moving object and the time data item. The controller calculates the cut region on the basis of this position information item and the like acquired from the outside. Therefore, processing such as movement information detection and calculation of the position information item of the moving object does not become a bottle neck in terms of the speed of the processing of the controller. Thus, it is possible to reduce the delay time from the first video signal to the output of the second video signal for live broadcasting.

In addition, the frame of the first video signal is associated with the position information item of the moving object, using the time data items synchronized with each other or approximately synchronized with each other. Therefore, the controller can correctly determine the frame that is a target from which the video data item is cut, applying the cut region calculated on the basis of the position information item of the moving object. That is, it is possible to reduce faults related to a timing of cutting from the first video data item.

In the above-mentioned video processing apparatus, the controller may be configured to calculate the cut region having an aspect ratio of the second frame resolution.

In the above-mentioned video processing apparatus, the controller may be configured to calculate the cut region including a plurality of positions respectively indicated by the one or more position information items of the one time interval and one or more position information items of a subsequent time interval, the one or more position information items of the subsequent time interval being at least closer to a head of the subsequent time interval.

With this, the cut region including a subsequent region to which the moving object will further move after the last time of the time interval that is a target from which the video data item is cut is calculated. Therefore, for example, in a case of a soccer game, cutting of the video data item including a state of a subsequent region just before a long pass to which the long pass will be made, that is, a state of motion of a player who will receive the long pass is performed. Thus, a video data item excellent in the value of viewing as a digest can be obtained.

The above-mentioned video processing apparatus may further include an operation input unit that receives, from an operator, an instruction to change the time interval, in which the controller may be configured to change the time interval in accordance with the instruction received by the operation input unit.

The time interval can be manually changed. Therefore, it is possible to set a suitable time interval in a manner that depends on a range or speed of motion in a sporting event.

In the above-mentioned video processing apparatus, the controller may be configured to skip, if a position of positions of the moving object of a subsequent time interval that are used for calculating a subsequent cut region, which is closest to an end of a current cut region, is located inside the current cut region by a predetermined distance or longer from the end of the current cut region, calculation of the cut region and validate the current cut region.

With this, it is possible to omit unnecessary calculation processing for updating the cut region and further reduce the delay time from the first video signal to the output the second video signal for live broadcasting. Further, the viewer's fatigue of the output video can be reduced.

In the above-mentioned video processing apparatus, the controller may be configured to receive, from an outside, an event information item including information that specifies a location of the object and set a region including the location specified by the event information item in a picture frame of the first video signal, as the cut region.

Also with this mechanism, the calculation of the cut region can be omitted. Thus, the delay time from the first video signal to the output the second video signal for live broadcasting can be further reduced.

In the above-mentioned video processing apparatus, the video input unit may include a switching unit that selects one of a plurality of first video signals respectively captured by a plurality of cameras that captures videos of a common subject in different directions and having a first frame resolution, to which a time data item of each frame has been added, and the controller may be configured to read, from the position information storage unit, at least the one or more position information items of the one time interval, determines a movement direction of the moving object on the basis of one or more positions respectively indicated by the one or more read position information items, and causes the switching unit to select a first video signal of the one camera whose capturing direction is opposed or approximately opposed to the determined movement direction of the moving object.

With this configuration, in a case where the moving object is, for example, a ball or a player of a soccer game, an impact video showing the player from approximately the front can be obtained.

In the above-mentioned video processing apparatus, the switching unit of the video input unit may be configured to be capable of selecting one of the plurality of first video signals and a third video signal captured by one or more cameras for capturing videos of a region that capture videos of a particular region of the object at the second frame resolution, to which a time data item of each frame has been added, and the controller may be configured to cause the switching unit to select the third video signal of the camera for capturing a video of the region if a cut region calculated on the basis of one or more positions respectively indicated by one or more position information items read from the position information storage unit includes the particular region.

If the third video signal is selected by the switching unit, the calculation of the cut region, the cutting of the video data item, conversion to have the second frame resolution, and the like are made unnecessary by the controller. That is, the video data item of the third video signal selected by the switching unit can be obtained as the second video data item as it is. Therefore, also with this, the delay time from the first video signal to the output the second video signal for live broadcasting can be further reduced. Further, an impact video can be obtained by, for example, arrangement of a camera for capturing a video of the region so as to capture a video of offensive players within the goal area, for example, approximately from front.

Further, a video processing system of another embodiment according to the present technology includes a camera, a position information generation apparatus, and a video processing apparatus.

The camera performs fixed-point shooting on a subject including a moving object at a first frame resolution and outputs a first video signal to which a time data item of each frame has been added.

The position information generation apparatus is configured to generate a position information item of the moving object.

The video processing apparatus includes a video input unit, a video storage unit, a position information input unit, a position information storage unit, a designation start time storage unit, a designation end time storage unit, and a controller.

The video input unit is configured to input the first video signal.

The video storage unit is configured to store a first video data item of each frame included in the input first video signal in association with the time data item.

The position information input unit is configured to receive the position information item generated by the position information generation apparatus.

The position information storage unit is configured to store the received position information item in association with a time.

The designation start time storage unit is configured to store a time that specifies a start of a time interval.

The designation end time storage unit is configured to store a time that specifies an end of the time interval.

The controller is configured to read, from the position information storage unit, one or more position information items for each time interval specified by the designation start time storage unit and the designation end time storage unit, calculate a cut region including one or more positions respectively indicated by the one or more read position information items, cut a video data item of the cut region from the first video data item of the time interval which has been stored in the video storage unit, and generate a second video data item having a second frame resolution from the cut video data item.

In the above-mentioned video processing system, the cameras may be respectively arranged to capture videos of the common subject in different directions, the video input unit of the video processing apparatus may include a switching unit that selects one of a plurality of first video signals respectively captured by the plurality of cameras, and the controller may be configured to determine a movement direction of the moving object on the basis of one or more positions respectively indicated by the one or more position information items read from the position information storage unit and cause the switching unit to select the first video signal of the one camera whose capturing direction is opposed or approximately opposed to the determined movement direction of the moving object.

The above-mentioned video processing system may further include a camera for a particular region that captures a video of a particular region of the subject at the second frame resolution and sends a third video signal in association with a time data item, in which the switching unit may be configured to be capable of selecting one video signal from the first video signal and the third video signal, and the controller may be configured to cause the switching unit to select any one of the one or more third video signals if the cut region calculated on the basis of one or more positions respectively indicated by the one or more position information items read from the position information storage unit includes the particular region.

A video processing method of another embodiment according to the present technology includes a video signal input step, a video storage step, a position information input step, a position information storage step, and a cut video data generation step.

The video signal input step includes inputting a first video signal captured at a first frame resolution by a camera, to which a time data item of each frame has been added.

The video storage step includes storing, in a video storage unit, a first video data item of each frame included in the input first video signal in association with the time data item.

The position information input step includes receiving a position information item of a particular moving object included in the first video signal as a part of a subject.

The position information storage step includes storing, in a position information storage unit, the acquired position information item in association with a time.

The cut video data generation step includes reading, by a controller, from the position information storage unit, one or more position information items for at least each particular time interval, calculating a cut region including one or more positions respectively indicated by the one or more read position information items, cutting a video data item of the cut region from the first video data item of the time interval which has been stored in the video storage unit, and generating a second video data item having a second frame resolution from the cut video data item.

Further, a video processing apparatus of another embodiment according to the present technology includes a video input unit, a video storage unit, a position information input unit, a position information storage unit, and a controller.

The video input unit inputs a first video signal captured at a first frame resolution by a camera, to which a time data item of each frame has been added.

The video storage unit stores a first video data item of each frame included in the input first video signal in association with the time data item.

The position information input unit receives a position information item with a time data item of a particular moving object included in the first video signal as a part of a subject.

The position information storage unit stores the received position information item in association with a time.

The controller reads, from the position information storage unit, one or more position information items for at least a particular time interval, calculates a cut region including one or more positions respectively indicated by the one or more read position information items, cuts a video data item of the cut region from the first video data item of the time interval which has been stored in the video storage unit, and generates a second video data item having a second frame resolution from the cut video data item.

Advantageous Effects of Invention

As described above, in accordance with the present technology, it is possible to achieve functional improvements of processing of generating video data items from input video signals.

It should be noted that the effects described here are not necessarily limitative and may be any effects described in the present disclosure.

MODE(S) FOR CARRYING OUT THE INVENTION

Hereinafter, embodiments according to the present technology will be described.

First Embodiment

This embodiment relates to a video processing apparatus and a video processing system each of which generates, from a video data item of at least a partial time interval of a first video signal having a first frame resolution, which has been sent from a video transmission unit, a second video signal having a second frame resolution and including a range within which a moving object that is the target included in a subject has moved.

In the video processing apparatus and the video processing system of the embodiment according to the present technology, the frame resolution of the first video signal sent from the video transmission unit is higher than the frame resolution of the second video signal generated by the video processing apparatus. A case where the frame resolution of the first video signal is 8K (7680×4320) and the frame resolution of the second video signal is full HD (1920×1080) can be exemplified. Note that a "frame" described in this embodiment may be a "field" in interlace.

In the following description, assumed is a case where the first video signal is a video signal obtained by performing fixed-point shooting on a soccer game in an entire game area 2 with a camera. The video transmission unit may be incorporated in the camera or may relay and transmit the first video signal sent from the camera, to the video processing apparatus. Hereinafter, a description will be made assuming that the video transmission unit is incorporated in the camera.

Figure 1:
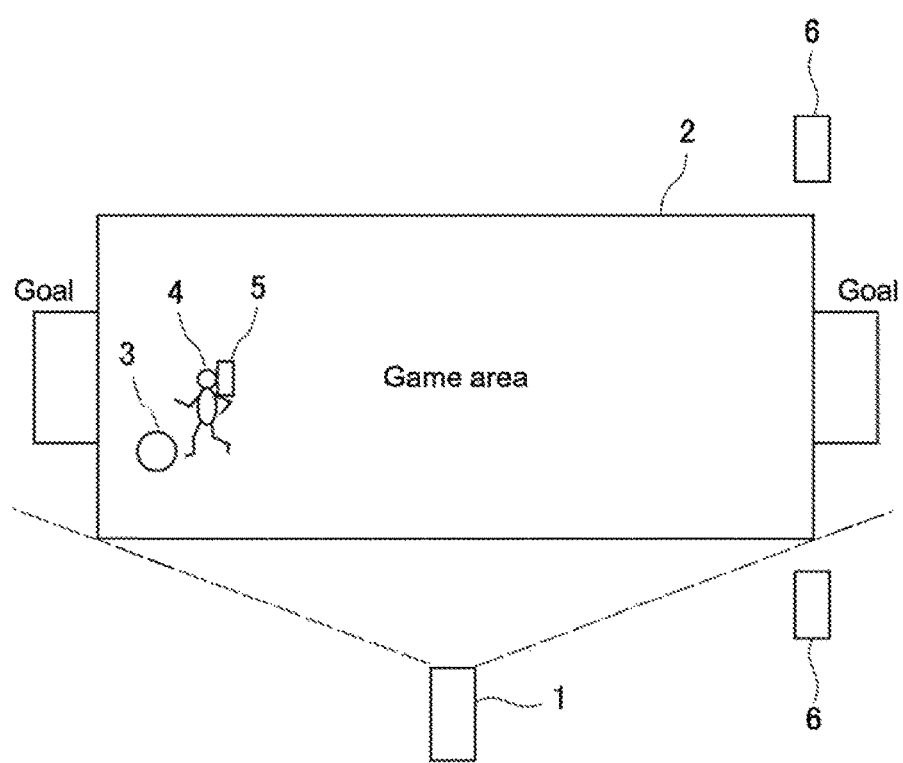
FIG. 1 A diagram showing an example of a positional relationship between a camera 1 and a game area 2 in a video processing system of this embodiment.

FIG. 1 is a diagram showing an example of a positional relationship between a camera 1 and a soccer game area 2 in a video processing system of this embodiment.

As shown in the figure, the camera 1 is fixed at a position at which the camera 1 can perform fixed-point shooting on the entire soccer game area 2.

Figure 2:
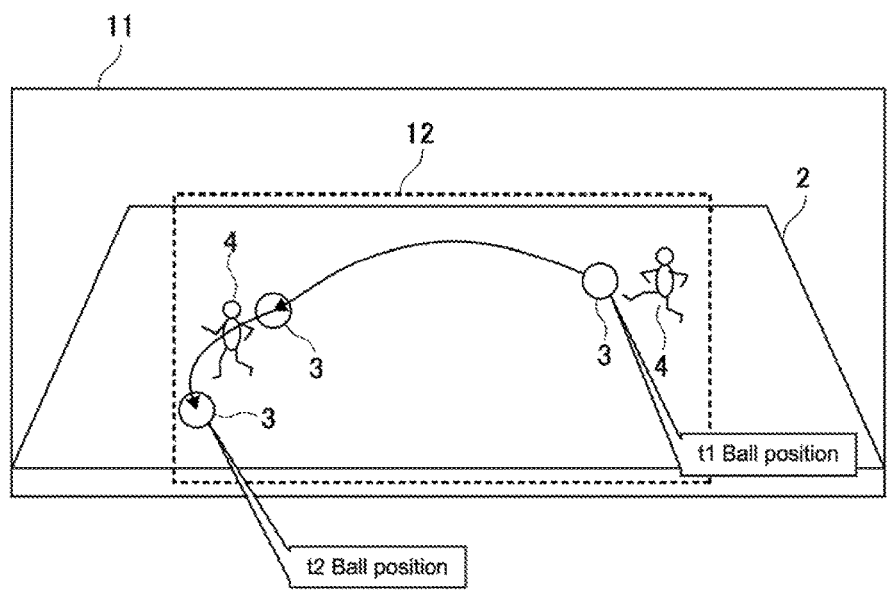
FIG. 2 A diagram showing a relationship between an entire picture frame 11 corresponding to a first frame resolution of the first video signal output from the camera 1 shown in FIG. 1 and a rectangular cut region 12 of a video data item calculated by the video processing apparatus of this embodiment.

FIG. 2 is a diagram showing a relationship between an entire picture frame 11 corresponding to a first frame resolution of a first video signal output from the camera 1 and a rectangular cut region 12 of a video data item calculated by the video processing apparatus of this embodiment.

Here, the size and position of the cut region 12 are determined on the basis of, for example, a range within which a moving object (e.g., ball 3) that is a target has moved in a partial time interval of the first video signal. The cut region 12 is set to be a region having an aspect ratio of a second frame resolution.

[Configuration of Video Processing Apparatus]

Figure 3:
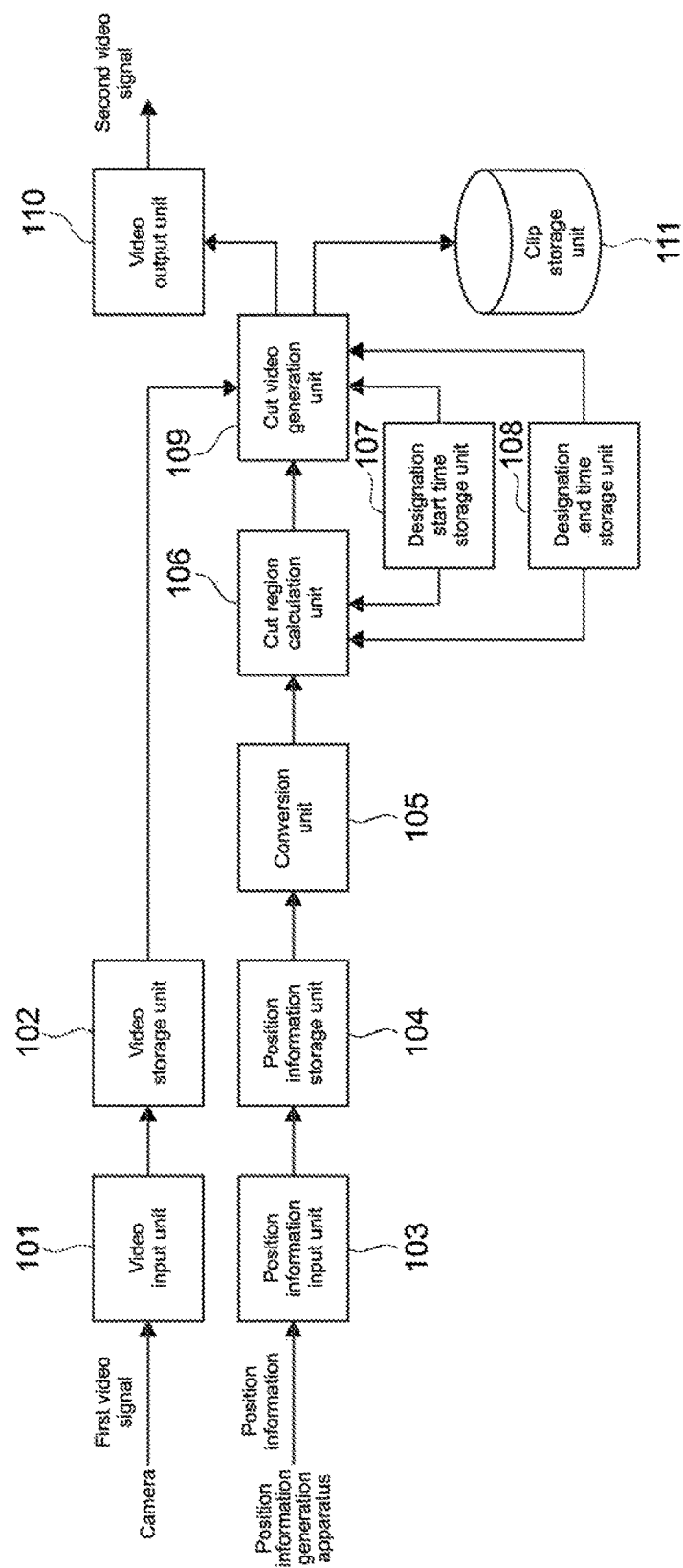
FIG. 3 A block diagram functionally showing a configuration of a video processing apparatus of a first embodiment according to the present technology.

FIG. 3 is a block diagram functionally showing a configuration of the video processing apparatus of the first embodiment according to the present technology.

This video processing apparatus 100 includes a video input unit 101, a video storage unit 102, a position information input unit 103, a position information storage unit 104, a conversion unit 105, a cut region calculation unit 106, a designation start time storage unit 107, a designation end time storage unit 108, a cut video generation unit 109, a video output unit 110, and a clip storage unit 111.

The video input unit 101 receives a first video signal having a first frame resolution that is transmitted from the camera 1. For example, a plurality of 3G-SDI (Serial Digital Interface) interfaces are used for transmitting the first video signal having a frame resolution of 8K, for example.

The camera 1 performs fixed-point imaging on the game area 2 that is a subject and sends a first video signal to which a time code of each frame has been added. The time code is provided by a clock inside the camera 1, which is periodically synchronized with a standard time acquired by a time server or the like over the Internet, for example.

The video input unit 101 receives the first video signal transmitted from the camera 1 and causes the video storage unit 102 to store each frame of this first video signal in association with the time code.

Note that the video input unit 101 does not need to utilize the time code added to the first video signal and may utilize a time code provided on the basis of a time provided from a built-in real time clock or a clock inside a computer 130, which is periodically synchronized with a time provided from an outside such as a time server over the Internet.

The video storage unit 102 stores each frame of the first video signal input by the video input unit 101 in association with the time code. A video data item of each frame of the first video signal is stored in the video storage unit 102 while keeping the first frame resolution. Alternatively, one obtained by compressing the video data item of each frame of the first video signal by a lossless compression technique may be stored.

The position information input unit 103 cyclically receives a position information item of the moving object, which is sent from an external position information generation apparatus 140 (FIG. 5), and a time code associated with it.

In this embodiment, the position information items of the moving object, which are received by the position information input unit 103, are position information items of the ball 3 and one or more players 4 in a ground coordination system or position information items in a coordination system of the picture frame of the first video signal. Alternatively, only the position information item of the ball 3 may be received by the position information input unit 103.

It is favorable that the time code of each frame of the first video signal and the time code associated with the position information item are synchronized with each other. However, even if they are not completely synchronized with each other, there is no problem related to the processing.

It is favorable that the position information item of the moving object and the first video signal when the moving object is at that position are input by the video processing apparatus 100 at the same timing. However, even if the position information item of the moving object is provided with slight delay (e.g., with delay of approximately several seconds), it merely influences an output timing of a cut video data item and there is no problem related to the processing.

The position information storage unit 104 stores a position information item of each moving object, which has been received by the position information input unit 103, and a time code in association with each other.

The conversion unit 105 reads the position information item of each moving object from the position information storage unit 104. In a case where this position information item is a position information item in the ground coordination system, the conversion unit 105 converts it into a position information item in the coordination system within the picture frame 11 of the first video signal. It should be noted that the conversion of the conversion unit 105 is unnecessary in a case where the input position information item is originally the position information item in the coordination system of the picture frame of the first video signal.

The designation start time storage unit 107 is an area for storing a time code of a frame from which cutting is to be started.

The designation end time storage unit 108 is an area for storing a time code of a frame at which cutting is to be terminated. The time code of the start frame and the time code of the end frame may be designated with triggers artificially provided by, for example, an operator of this video processing apparatus 100. Alternatively, they may be designated using event information items or the like provided from an outside of this video processing apparatus 100 as triggers.

The cut region calculation unit 106 reads the time code of the start frame from the designation start time storage unit 107 and reads the time code of the end frame from the designation end time storage unit 108. The cut region calculation unit 106 reads, from the position information storage unit 104, one or more position information items of the moving object in a time interval from a time indicated by the time code of the start frame to a time indicated by the time code of the end frame. The cut region calculation unit 106 calculates a region having an aspect ratio of a second frame resolution and including one or more positions indicated by the one or more position information items read from the position information storage unit 104, as a cut region. A calculation method for this cut region will be described later in further detail.

The cut video generation unit 109 reads the time code of the start frame from the designation start time storage unit 107 and the time code of the end frame from the designation end time storage unit 108. The cut video generation unit 109 reads, from the video storage unit 102, each frame of the time interval from the time indicated by the time code of the start frame to the time indicated by the time code of the end frame. The cut video generation unit 109 cuts a video data item that is a portion corresponding to a cut region of each read frame.

With this, video data items of a rectangular region 12 for the above-mentioned time interval which has the aspect ratio of the second frame resolution and includes at least a range within which the moving object has moved in the time interval from the time indicated by the time code of the start frame to the time indicated by the time code of the end frame is cut from each frame of the above-mentioned time interval of the first video signal.

The cut video generation unit 109 enlarges (pixel interpolation) or reduces (pixel decimation) each video data item cut from each frame to have the second frame resolution of the full HD or the like to thereby generate a second video data item.

The video output unit 110 converts the second video data item cut by the cut video generation unit 109 into, for example, an HD-SDI signal that is the second video signal and outputs it. The HD-SDI is a transmission standard called high-definition serial digital interface.

The video output unit 110 includes a buffer. The video output unit 110 delays second video data items intermittently provided from the cut video generation unit 109 with the buffer and outputs them as second video signals that are continuous HD-SDI signals or the like.

In the above-mentioned manner, the second video signals for the above-mentioned time interval which has the second frame resolution and includes at least the range within which the moving object has moved in the time interval are obtained from the first video signals having the first frame resolution which have been transmitted from the camera 1. This second video signal becomes a video obtained by zooming in a range including the rectangular range within which the moving object has moved in the above-mentioned time interval, with respect to the video of the first video signals.

An HD-SDI signal output from the video output unit 110 is transmitted to, for example, an external HD broadcasting device at the same frame rate as the first video signal input by the video input unit 101.

The clip storage unit 111 changes the second video data items having the second frame resolution, which are generated by the cut video generation unit 109, into a file and stores it as a randomly accessible video clip.

[Setting Method for Start/End Time of Time Interval]

In live broadcasting of sports such as soccer, it is desirable that a video clip of a remarkable play such as a corner kick and a free kick can be rapidly generated and provided to a viewer. In view of this, this video processing apparatus 100 is configured to enable an operator to designate, in real time, each of the start and end times of the time interval for cutting video data items when the game is in progress.

Figure 4:
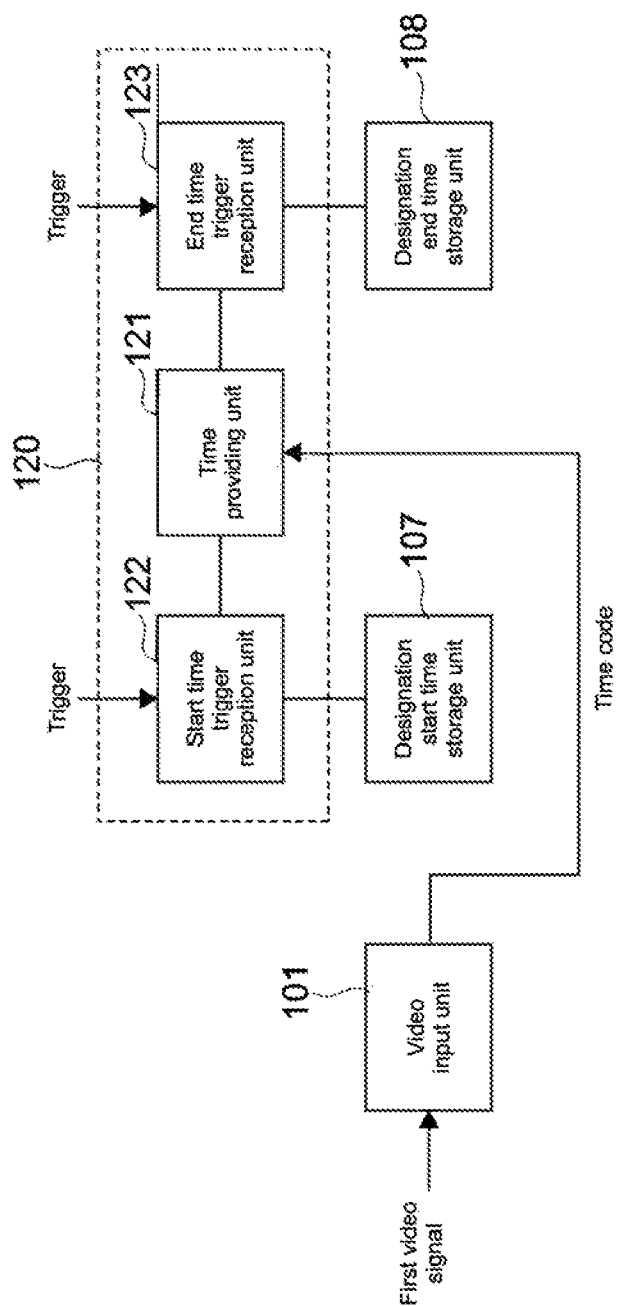
FIG. 4 A block diagram showing a configuration of a time interval setting unit 120 that sets each of the start and end times of the time interval for cutting video data items.

FIG. 4 is a block diagram showing a configuration of a time interval setting unit 120 that sets each of the start and end times of the time interval for cutting video data items.

The time interval setting unit 120 includes a time providing unit 121, a start time trigger reception unit 122, and an end time trigger reception unit 123.

The time providing unit 121 has a clock function. The time providing unit 121 synchronizes the clock function with a time code added to a first video signal input by the video input unit 101 or with a time acquired by accessing a time server over the Internet.

When receiving, from the outside, a trigger for designating the start time of the time interval for cutting video data items, the start time trigger reception unit 122 inquires the time providing unit 121 about a time and sets, in the designation start time storage unit 107, a time code indicating the time that is a response from the time providing unit 121.

When receiving, from the outside, a trigger for designating the end time of the time interval for cutting video data items, the end time trigger reception unit 123 inquires the time providing unit 121 about a time and sets, in the designation end time storage unit 108, a time code indicating the time that is the response from the time providing unit 121.

As a method of generating an external trigger, there is a method of manually inputting a trigger by the operator. In addition to such a method, there is a method of generating a trigger by detecting the fact that, for example, a remarkable play such as a corner kick and a free kick will take place by image recognition of the first video signal or a sensor placed in a stadium.

The provision of such a time interval setting unit 120 makes it possible to designate, in real time, each of the start and end times of the time interval for cutting video data items and to rapidly generate the video clip and provide it to the viewer.

[Configuration of Video Processing System 10 and More Specific Configuration of Video Processing Apparatus 100]

Figure 5:
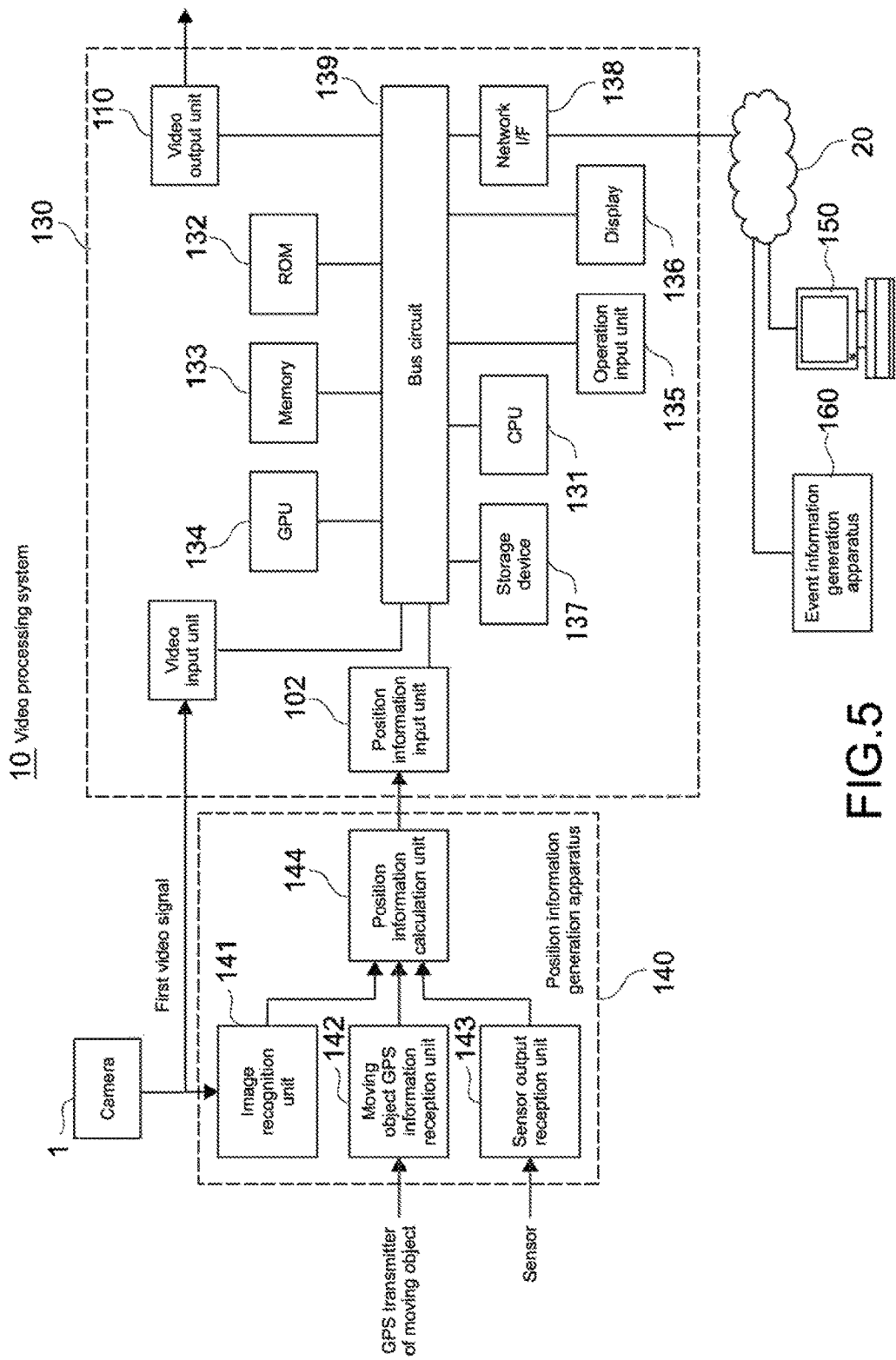
FIG. 5 A block diagram showing a configuration of a video processing system 10 of the first embodiment and a more specific configuration of a video processing apparatus 100.

FIG. 5 is a block diagram showing a configuration of a video processing system 10 using the video processing apparatus 100 of the first embodiment and a more specific configuration of the video processing apparatus 100.

The video processing system 10 is mainly constituted of the camera 1, the position information generation apparatus 140, and the video processing apparatus 100.

The video processing apparatus 100 can be realized by the computer 130.

The computer 130 includes a CPU (Central Processing Unit) 131, a ROM (Read Only Memory) 132, a RAM (Random Access Memory) 133, a GPU (Graphics Processing Unit) 134, an operation input unit 135, a display 136, a storage device 137, a network interface 138, a bus circuit 139, and the like. The computer 130 further includes an input interface of the first video signal that is the video input unit 101, an input interface of the position information item that is the position information input unit 103, an output interface of the second video signal that is the video output unit 110, and the like.

By executing a program stored in the RAM 133 used as a main memory of the computer 130, the CPU 131 operates as at least the conversion unit 105, the cut region calculation unit 106, the cut video generation unit 109, and the like of the above-mentioned video processing apparatus 100.

The RAM 133 is used as the main memory of the computer 130. The main memory is also as the video storage unit 102, the position information storage unit 104, the designation start time storage unit 107, the designation end time storage unit 108, and the like of the above-mentioned video processing apparatus 100.

The GPU 134 operates together with the CPU 131 to perform various types of editing processing of the video data items. That is, the GPU 134 may be used as enlargement processing, reduction processing, and the like of the video data items at, for example, the cut video generation unit 109 of the above-mentioned video processing apparatus 100.

The operation input unit 135 is an interface for the operator to input various types of information and commands into the computer 130. The operation input unit 135 includes, for example, a keyboard, a mouse, and a microphone. The operation input unit 135 may be used as means for inputting a trigger for designating the start time of the time interval for cutting video data items into the above-mentioned time interval setting unit 120 by the operator.

The display 136 is an interface for presenting various types of information to the operator. The display 136 is, for example, a liquid-crystal display.

The storage device 137 is, for example, a nonvolatile mass storage apparatus such as an HDD (Hard Disk Drive) and an SSD (Solid State Drive). The storage device 137 is used as the above-mentioned clip storage unit 111 or the like. Further, it may be used as a storage area for first video data items of first video signals, video data items cut from the first video data items, and further second video data items having the second frame resolution.

The network interface 138 is an interface that processes connection with a network 20 such as a LAN (Local Area Network) and a WAN (Wide Area Network).

[Configuration of Position Information Generation Apparatus 140]

Next, a configuration of the position information generation apparatus 140 belonging to the video processing system 10 will be described.

The position information generation apparatus 140 is an apparatus that cyclically generates a position information item of each moving object, adds a time code to the generated position information item, and sends it to the video processing apparatus 100. A cycle for providing the position information item is, for example, approximately 0.2 seconds. It should be noted that it is favorable that this cycle is as short as possible.

The position information generation apparatus 140 is constituted of an image recognition unit 141, a moving object GPS information reception unit 142, a sensor output reception unit 143, a position information calculation unit 144, and the like.

The image recognition unit 141 calculates position information items of the moving objects (ball 3 and respective players 4) that are targets in the subject of the first video signal (position information items in the coordination system within the picture frame 11 of the first video signal) by the image recognition technique and outputs them to the position information calculation unit 144. The image recognition unit 141 calculates a position information item of each moving object in a cycle of, for example, approximately 0.2 seconds, adds a time code of a frame that is a recognition target to the position information item, and outputs it to the position information calculation unit 144.

The moving object GPS information reception unit 142 receives, as shown in FIG. 1, a moving object GPS information item with a time data item which has been emitted from a GPS transmitter 5 attached to each player 4, for example, and outputs it to the position information calculation unit 144.

The sensor output reception unit 143 receives, as shown in FIG. 1, a passage detection data item with the time data item of a moving object passage sensor 6 that detects the fact that each moving object that is the target has passed a particular position such as a goal line of the game area 2 and sends a passage detection information item to the position information calculation unit 144.

The position information calculation unit 144 calculates the position information item of the moving object by individually or comprehensively processing the respective information items received from the image recognition unit 141, the moving object GPS information reception unit 142, and the sensor output reception unit 143.

An example of the comprehensive processing of the respective information items received from the image recognition unit 141, the moving object GPS information reception unit 142, and the sensor output reception unit 143 by the position information calculation unit 144 will be described.

1. The position information item determination unit 144 determines a position information item with a time code of the moving object such as the ball 3 which has been recognized by the image recognition unit 141 by, for example, matching it with a passage detection data item with a time data item which has been received by the sensor output reception unit 143 (e.g., data item indicating when the moving object such as the ball 3 has passed an end line of the game area 2).

2. The position information calculation unit 144 determines a position information item of each player 4 by, for example, converting a position information item with a time data item in the ground coordinate system of the game area 2 of the player 4 which has been provided by the moving object GPS information reception unit 142 into a position information item in the coordinate system of the picture frame of the first video signal and matching it with a position information item of each player 4 with a time code which has been recognized by the image recognition unit 141 or with a passage detection data item with a time data item which has been provided by the sensor output reception unit 143.

Note that the information items may be mutually exchanged among the image recognition unit 141, the moving object GPS information reception unit 142, and the sensor output reception unit 143. With this, an enhancement of the calculation accuracy of the position information item according to the respective methods can be expected.

[Video Clip Generation Processing]

Next, video clip generation processing by the video processing apparatus 100 will be described.

Figure 6:
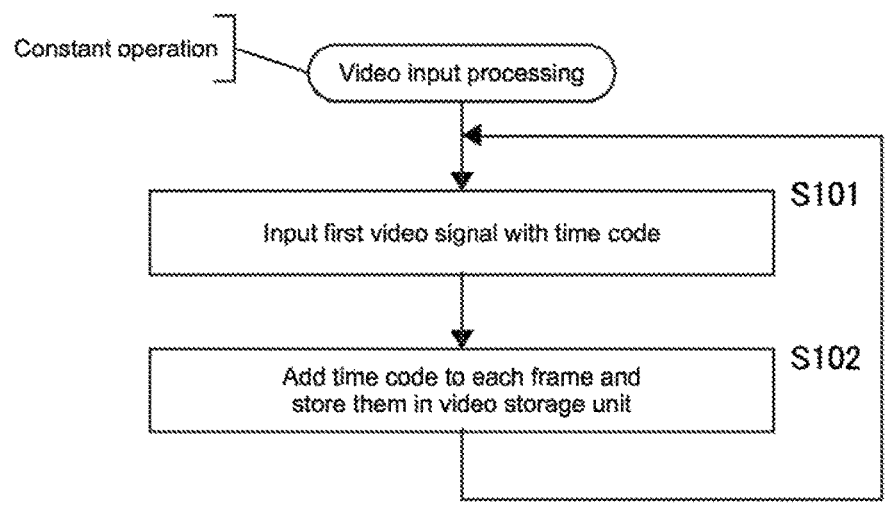
FIG. 6 A flowchart of video input processing by the video processing apparatus 100 of the first embodiment.

FIG. 6 is a flowchart of video input processing at a previous stage of the video clip generation processing.

Figure 7:
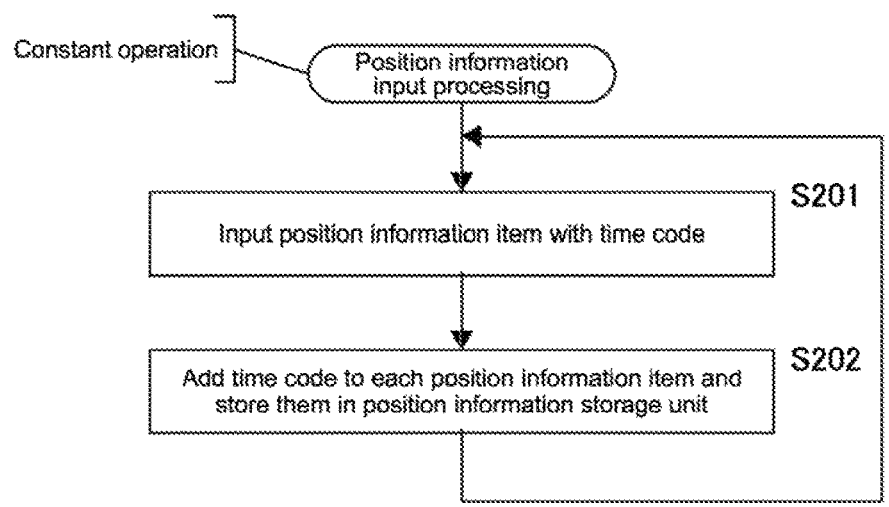
FIG. 7 A flowchart of position information input processing by the video processing apparatus 100 of the first embodiment.

FIG. 7 is a flowchart of position information input processing at a previous stage of the video clip generation processing.

Figure 8:
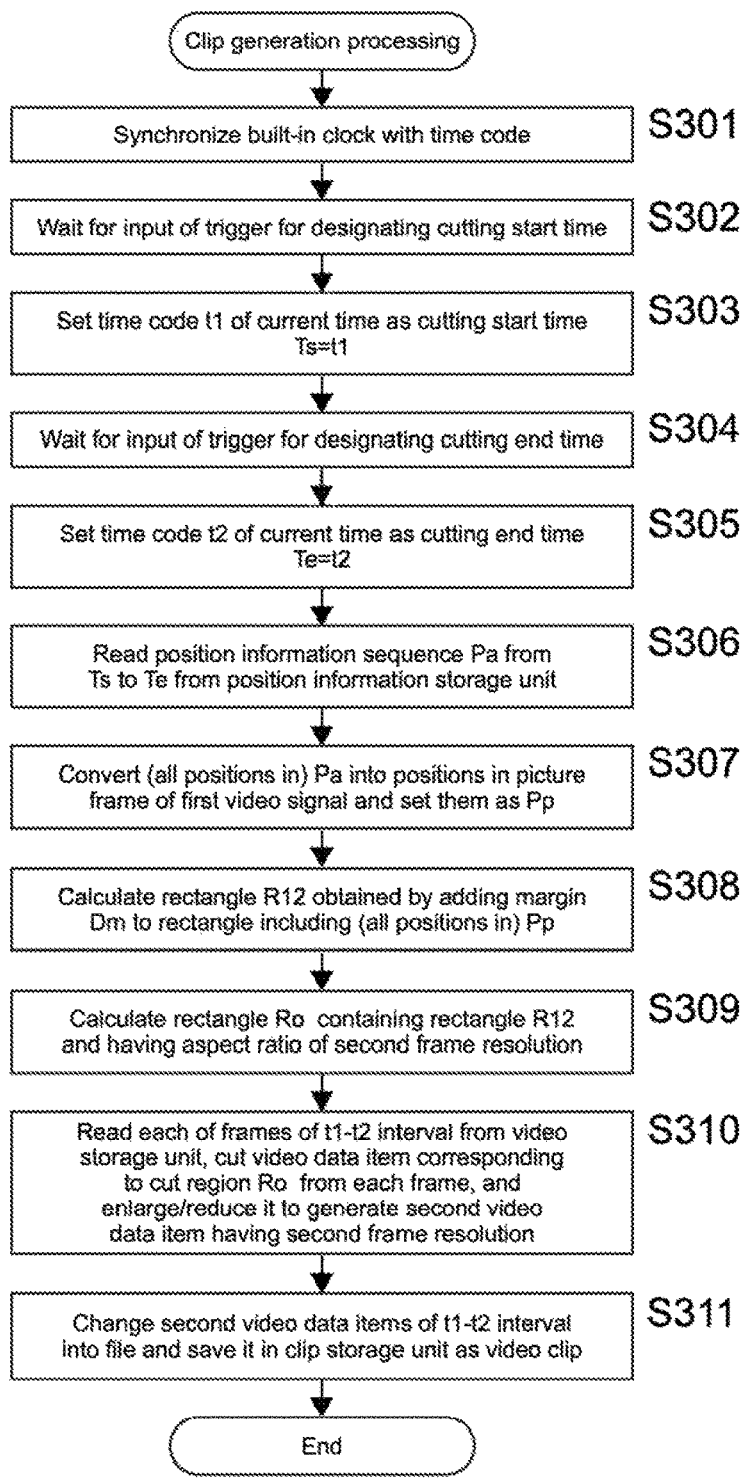
FIG. 8 A flowchart of video clip generation processing by the video processing apparatus 100 of the first embodiment.

FIG. 8 is a flowchart of the video clip generation processing.

(Video Input Processing)

As shown in FIG. 6, the video input unit 101 inputs a first video signal having a first frame resolution with a time code which has been transmitted by the camera 1 (Step S101). The video input unit 101 stores a first video data item of each frame in the input first video signal, in the video storage unit 102 in association with the time code added to the video signal (Step S102).

(Position Information Input Processing)

As shown in FIG. 7, the position information input unit 103 receives, from the position information generation apparatus 140, a position information item of the moving object to which the time code has been added (Step S201). Here, it is favorable that the time code added to the position information item is synchronized with the time code added to the video signal. However, it may be approximately synchronized therewith. The position information input unit 103 stores the received position information item of the moving object in the position information storage unit 104 within the main memory in association with the time code (Step S202).

(Video Clip Generation Processing)

As shown in FIG. 8, in the computer 130 of the video processing apparatus 100, the CPU 131 (time providing unit 121 of time interval setting unit 120) synchronizes the time of the built-in clock (real time clock) with the time indicated by the time code added to the first video signal input by the video input unit 101 (Step S301). Note that the time code may be acquired from the time server over the network 20 through the network interface 138. Alternatively, it may be synchronized with the built-in clock of the camera 1, communicating with the camera 1.

Next, the CPU 131 (start time trigger reception unit 122 of time interval setting unit 120) waits for input of a trigger for designating a cutting start time of the video data item (Step S302).

When the trigger for designating the cutting start time of the video data item is input, the CPU 131 (start time trigger reception unit 122) inquires the time providing unit 121 about a time at which that trigger was input and causes the RAM 133 (designation start time storage unit 107) to store a time code t1 indicating the time that is the response, as a cutting start time Ts (Step S303).

Subsequently, the CPU 131 (end time trigger reception unit 123 of time interval setting unit 120) waits for input of a trigger for designating a cutting end time of the video data item (Step S304).

When the trigger for designating the cutting end time of the video data item is input, the CPU 131 (end time trigger reception unit 123) inquires the time providing unit 121 about a time at which that trigger was input and causes the RAM 133 (designation end time storage unit 108) to store a time code t2 indicating the time that is the response, as a cutting end time Te (Step S305).

The CPU 131 (cut region calculation unit 106) reads the time code t1 from the RAM 133 (designation start time storage unit 107) and reads the time code t2 from the RAM 133 (designation end time storage unit 108). The CPU 131 (cut region calculation unit 106) reads position information items of a time interval from the time code t1 to the time code t2 as a position information sequence Pa from the RAM 133 (position information storage unit 104) (Step S306). The time interval from the time code t1 to the time code t2 is a time interval from t1 to t2 (exclusive of t2). Hereinafter, it will be referred to as a t1-t2 interval. Other time intervals will also be similarly referred.

The CPU 131 (conversion unit 105) converts the respective position information items (position information items of moving object in ground coordinate system) in the position information sequence Pa into position information items in the coordinate system of the picture frame of the first video signal (position information sequence Pp) (Step S307).

The CPU 131 (cut region calculation unit 106) calculates a rectangle (rectangular range within which the moving object has moved in the t1-t2 interval) containing respective positions indicated by the respective position information items in the position information sequence Pp. More specifically, this rectangle may be a rectangle in contact with the respective positions at edges thereof.

The CPU 131 (cut region calculation unit 106) calculates a rectangle R12 obtained by adding a predetermined margin Dm to the calculated rectangle (Step S308).

The CPU 131 (cut region calculation unit 106) calculates a rectangle R0 including the calculated rectangle R12 and having an aspect ratio of a second frame resolution, as the cut region (Step S309).

The CPU 131 (cut video generation unit 109) reads each of frames of the t1-t2 interval from the RAM 133 (video storage unit 102) and cuts a video data item corresponding to the cut region R0 from each frame. In addition, the CPU 131 (cut video generation unit 109) enlarges (pixel interpolation) or reduces (pixel decimation) each of the cut video data items to have the second frame resolution in a manner that depends on needs. With this, second video data items having the second frame resolution and including at least the range within which the moving object has moved in the designated time interval can be obtained (Step S310).

The CPU 131 changes the second video data items having the second frame resolution of the t1-t2 interval into a file to be made into a video clip and saves it in the storage device 137 (clip storage unit 111) (Step S311).

[Delay Live Processing]

Hereinabove, the processing of generating the video clip of the designated time interval has been described. However, this video processing apparatus 100 is capable of continuously generating, from the input first video signal having the first frame resolution, the second video signal having the second frame resolution and including the range within which the moving object has moved, for each time interval set in advance.

In this case, assuming that the length of the time interval is for example 10 seconds, a delay of 10 seconds or more constantly occurs from the input of the first video signal into this video processing apparatus 100 to the output of the second video signal. It should be noted that there is substantially no problem in live broadcasting with such a delay time. Although a favorable length of the time interval differs in a manner that depends on the type (game) of the subject, a configuration in which a time interval from 1 second to 20 seconds is set considering the speed and the like of the moving object (ball) moving in the picture frame is possible, for example. Hereinafter, this processing of continuously generating, from the first video signal, the second video signal of the range within which the moving object has moved, for each time interval whose duration is designated in advance will be referred to as "delay live processing". Note that, prolonging the time interval prolongs a time in which the picture frame is stable, which can reduce the viewer's fatigue. In contrast, shortening the time interval enables more details to be observed or watched, which can increase the degree of excitement of the viewer. Such adjustability is one of effects of the present technology.

In the present specification, two types of delay live processing of delay live processing A and delay live processing B will be disclosed as the delay live processing.

[Delay Live Processing A]

Figure 9:
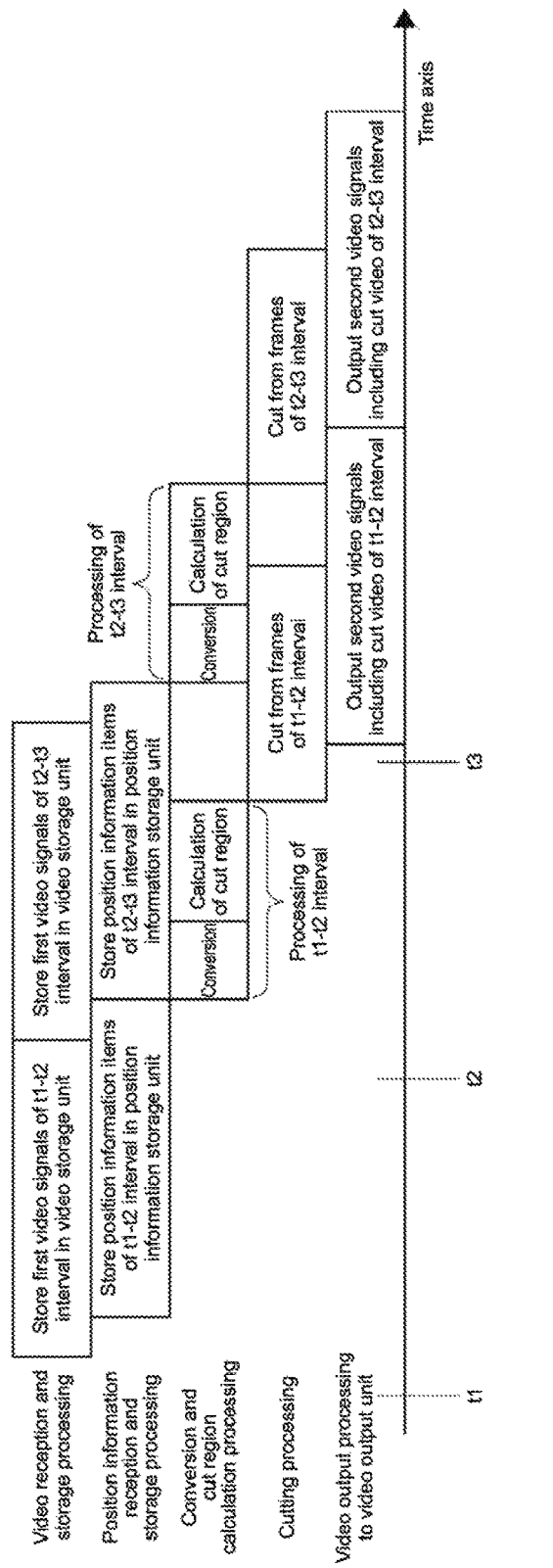
FIG. 9 A timing chart of delay live processing A.

FIG. 9 is a timing chart of the delay live processing A.

The signs "t1, t2, t3, . . . " shown at the bottom of the figure indicate time codes of the clock on a time axis. Each of intervals of t1, t2, t3, . . . is, for example, 5 seconds or 10 seconds.

The t1-t2 interval means an interval from t1 to t2 (exclusive of t2). Similarly, a t2-t3 interval means an interval from t2 to t3 (exclusive of t3).

First of all, reception and storage of first video signals of the t1-t2 interval are started, slightly delayed from the time t1. Further, reception and storage of position information items of the moving object of the t1-t2 interval are started, slightly delayed from the start of the reception and storage of the first video signals of the t1-t2 interval.

When the reception and storage of the position information items of the t1-t2 interval end, processing of converting the position information item of the t1-t2 interval into a position information item in the coordinate system of the picture frame of the first video signal is started.

When the conversion processing is completed, a cut region is calculated on the basis of this converted position information item of the t1-t2 interval.

When the cut region is calculated, a video data item corresponding to that cut region from each frame of the first video signal of the t1-t2 interval is cut. Every time a video data item is cut, that video data item is enlarged or reduced to have the second frame resolution and becomes the second video data item.

The second video data items made having the second frame resolution are encoded into second video signals and output by the video output unit 110 in the order that they were generated Reception and storage of first video signals of the t2-t3 interval are started directly after the reception and storage of the first video signals of the preceding t1-t2 interval end. Similarly, the reception and storage of the position information items of the moving object of the t2-t3 interval are also started directly after the reception and storage of the position information items of the moving object of the preceding t1-t2 interval end. Then, the conversion of the position information items between the coordination systems, the calculation of the cut region, the cutting of the video data items, and the output of the second video signals are repeated in a way similar to the processing of the preceding t1-t2 interval.

Figure 10:
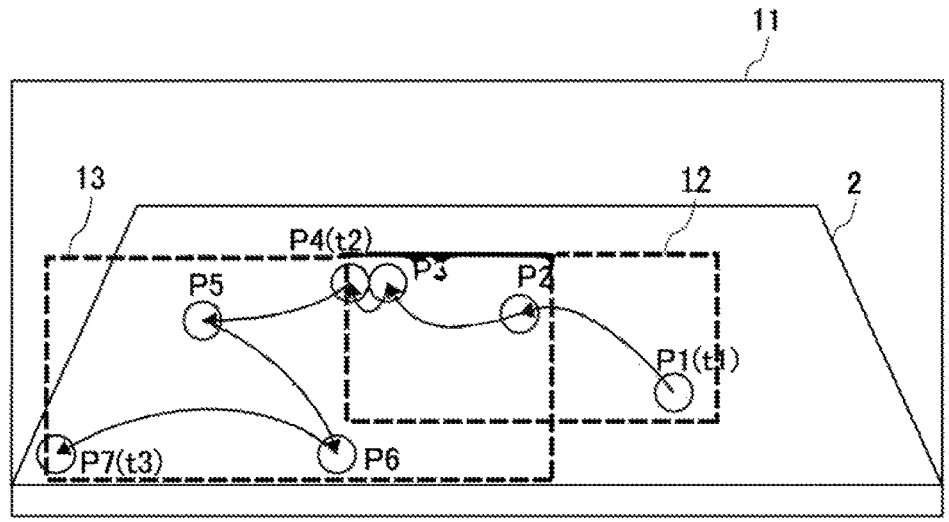
FIG. 10 A diagram showing an example of two cut regions generated in processing of a t1-t2 interval and a t2-t3 interval in the delay live processing A.

FIG. 10 is a diagram showing an example of two cut regions generated in processing of the above-mentioned two time intervals (t1-t2 interval and t2-t3 interval).

In FIG. 10, an entire rectangle shown by the solid line is the entire picture frame 11 of the first video signal captured by the camera 1. A rectangular region 12 shown by the broken line is the cut region with respect to the t1-t2 interval. A rectangular region 13 also shown by the broken line is the cut region with respect to the t2-t3 interval.

[Calculation Method for Cut Region]

The CPU 131 (cut region calculation unit 106) calculates a cut region 12 of the t1-t2 interval on the basis of the position information items of the t1-t2 interval. In this example, three positions P1, P2, and P3 indicated by position information items are present in the t1-t2 interval. The CPU 131 (cut region calculation unit 106) calculates a rectangle obtained by adding a predetermined margin to a rectangle including these three positions P1, P2, and P3 and generates a region having the aspect ratio of the second frame resolution and including a rectangle to which this margin has been added, as the cut region 12.

Similarly, the CPU 131 (cut region calculation unit 106) calculates a cut region 13 of the t2-t3 interval on the basis of position information items of the t2-t3 interval. In this example, three positions P4, P5, and P6 indicated by position information items are present in the t2-t3 interval. The CPU 131 (cut region calculation unit 106) calculates a rectangle obtained by adding a predetermined margin to the rectangle including these three positions P4, P5, and P6 and sets a region having the second frame resolution and including the rectangle to which this margin has been added, as the cut region 13.

In addition, the calculation method for the cut region will be described in detail.

Figure 11:
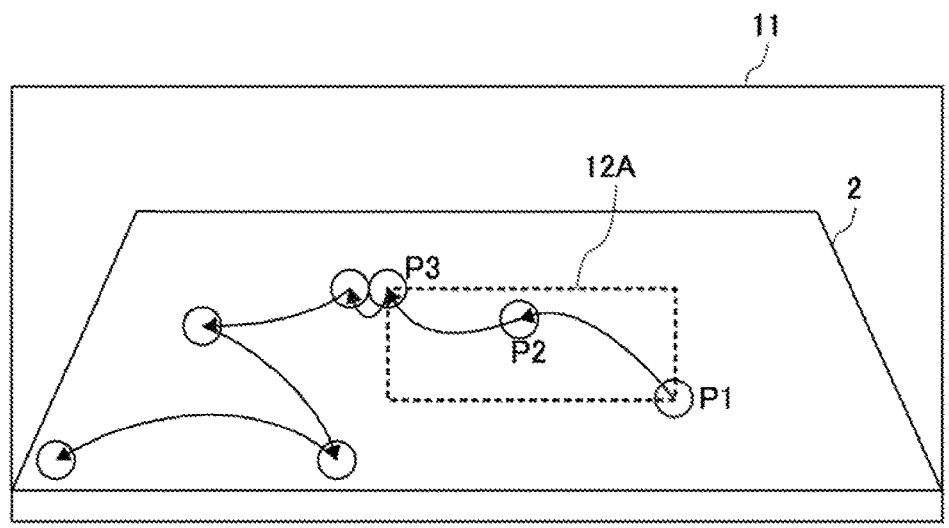
FIG. 11 A diagram showing a rectangular region 12A, which depends on three positions P1, P2, and P3 of the t1-t2 interval, before addition of a margin.

FIG. 11 shows a rectangular region 12A, which depends on the three positions P1, P2, and P3 of the t1-t2 interval, before addition of a margin.

Figure 12:
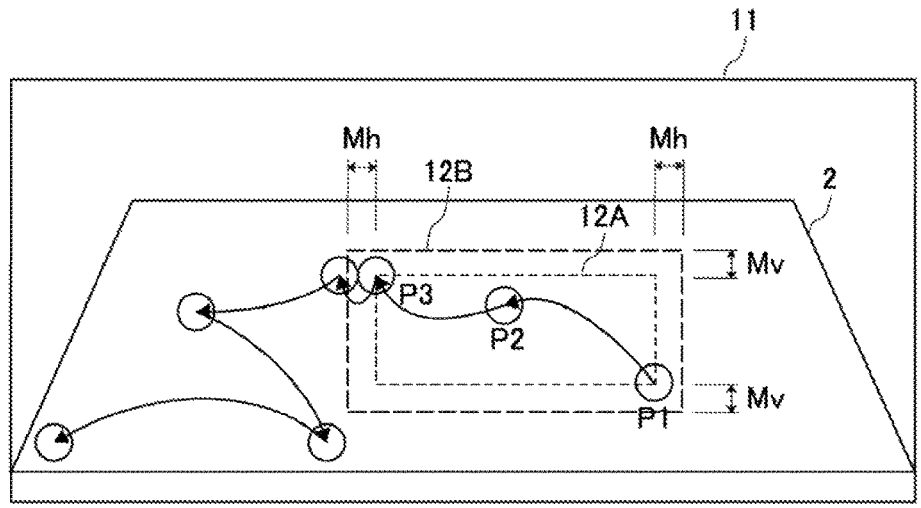
FIG. 12 A diagram showing a rectangular region 12B obtained by adding a margin to the rectangular region 12A.

FIG. 12 shows a rectangular region 12B obtained by adding the margin to the rectangular region 12A. Margins Mh are added to the left and the right of the rectangular region 12A and margins Mv are added to the top and the bottom. Here, the margin Mh and the margin Mv may take identical values or may take different values.

Figure 13:
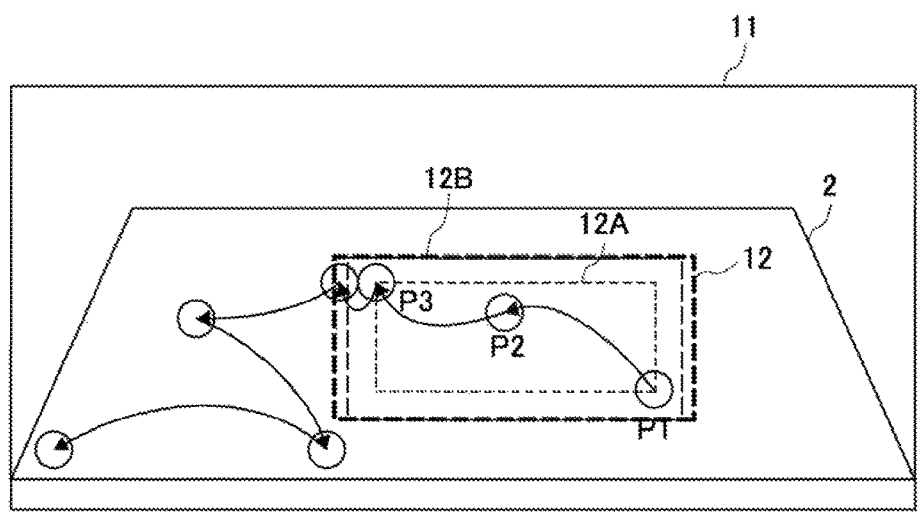
FIG. 13 A diagram showing the cut region 12 generated by adjusting the rectangular region 12B to which the margins have been added to have the aspect ratio of the second frame resolution.

FIG. 13 shows a cut region 12 generated by widening and adjusting the rectangular region 12B to which the margins have been added to have the aspect ratio of the second frame resolution.

Note that the aspect ratio of the full HD is 16:9. The rectangular region 12B to which the margins have been added and the cut region 12 are in such a positional relationship that centers thereof are made coinciding with each other, though not limited thereto. The cut region 12 may be shifted from the rectangular region 12B to which the margins have been added, in a direction in which the moving object moves or a direction opposite thereto.

If the cut region mathematically departs from the entire picture frame 11 of the first video signal due to addition of the margins or adjustment of the aspect ratio, how to add the margin may be changed or the positional relationship of the cut region 12 with the rectangular region 12B to which the margins have been added may be changed such that it can fit in that entire picture frame 11. By setting the margin set to have a vertical length equivalent to 2 m or more of a subject region and a horizontal length equivalent to 1 m or more of the subject region, for example, it is possible to prevent a person in contact with the moving object from departing from that region. Alternatively, it may be simply determined such that ⅓ of the portion from the center to the edge of the cut region becomes the margin.

[Delay Live Processing B]

Figure 14:
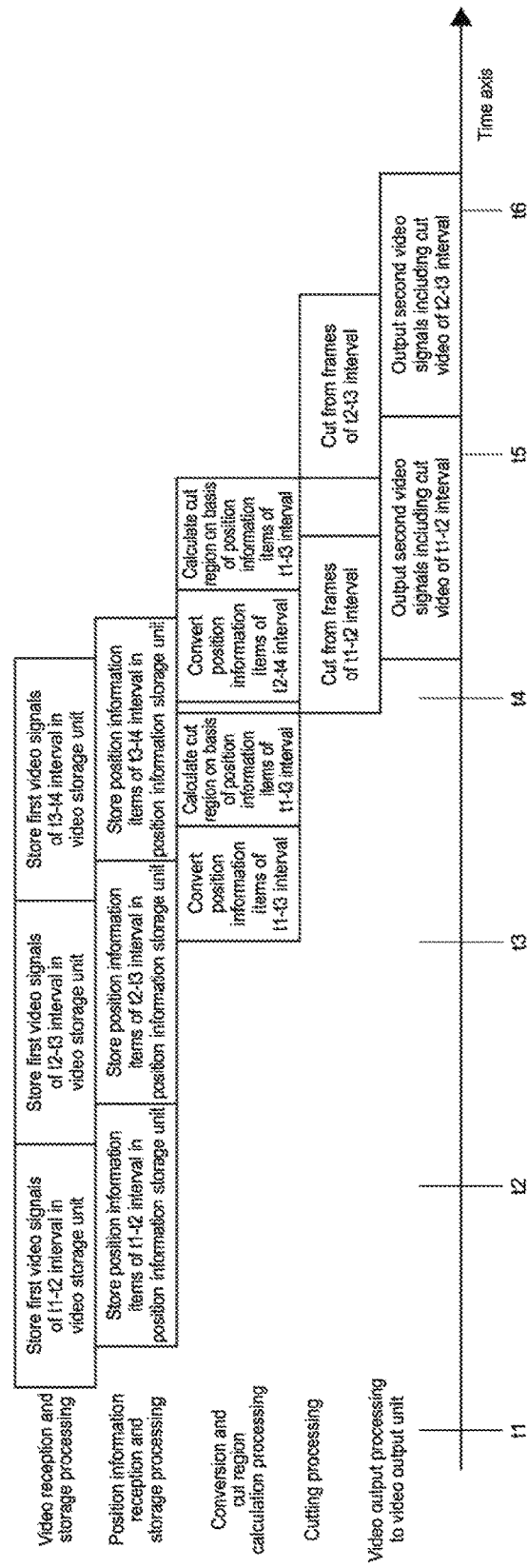
FIG. 14 A timing chart showing delay live processing B.

FIG. 14 is a timing chart showing the delay live processing B.

Here, three continuous time intervals (t1-t2 interval, t2-t3 interval, and t3-t4 interval) are shown.

In this delay live processing B, the cutting of the video data item from the frame of the first video signal of the t1-t2 interval is performed using the cut region calculated on the basis of position information items of a t1-t3 interval. That is, the cutting of the video data item from the frame of the first video signal of the t1-t2 interval is performed using the cut region calculated using the position information items of the t1-t3 interval including the t2-t3 interval in the future from the t1-t2 interval. Therefore, the second video signal can be obtained including a region to which the ball 3 that is the moving object will move.

Also in a subsequent cycle, the cutting of the video data item from the frame of the first video signal of the t2-t3 interval is performed using a cut region calculated on the basis of position information items of a t2-t4 interval and the second video signal is output.

Thereafter, the processing is repeated in a similar way.

Figure 15:
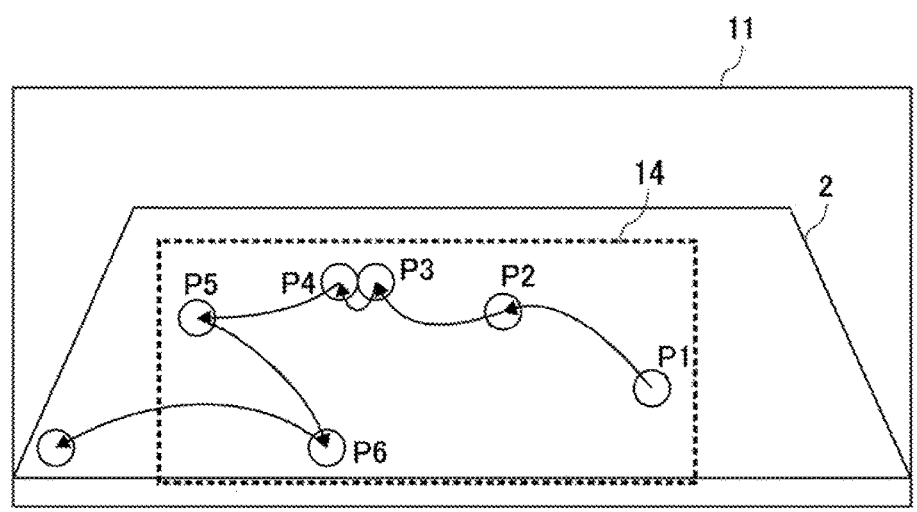
FIG. 15 A diagram showing a cut region calculated on the basis of position information items of a t1-t3 interval in the delay live processing B.

FIG. 15 is a diagram showing the cut region calculated on the basis of the position information items of the t1-t3 interval in the above-mentioned delay live processing B.

In this example, three positions P1, P2, and P3 indicated by position information items are present in the t1-t2 interval and three positions P4, P5, and P6 indicated by position information items are present in the t2-t3 interval.

The CPU 131 (cut region calculation unit 106) calculates a cut region 12 of the t1-t2 interval on the basis of the position information items present in the t1-t3 interval. More specifically, the CPU 131 (cut region calculation unit 106) adds a predetermined margin to a rectangle including the six positions P1, P2, P3, P4, P5, and P6 present in the t1-t3 interval and calculates a region having the aspect ratio of the second frame resolution and includes the rectangle to which the margin has been added, as a cut region 14. This cut region 14 is used for cutting a video data item from each frame of the first video signal of the t1-t2 interval. In other words, it is used in a time interval in which the ball 3 is located from the position P1 to the position of P3. Therefore, a video data item including a subsequent region to which the ball 3 will move from the last time of the t1-t2 interval can be obtained.

Figure 21:
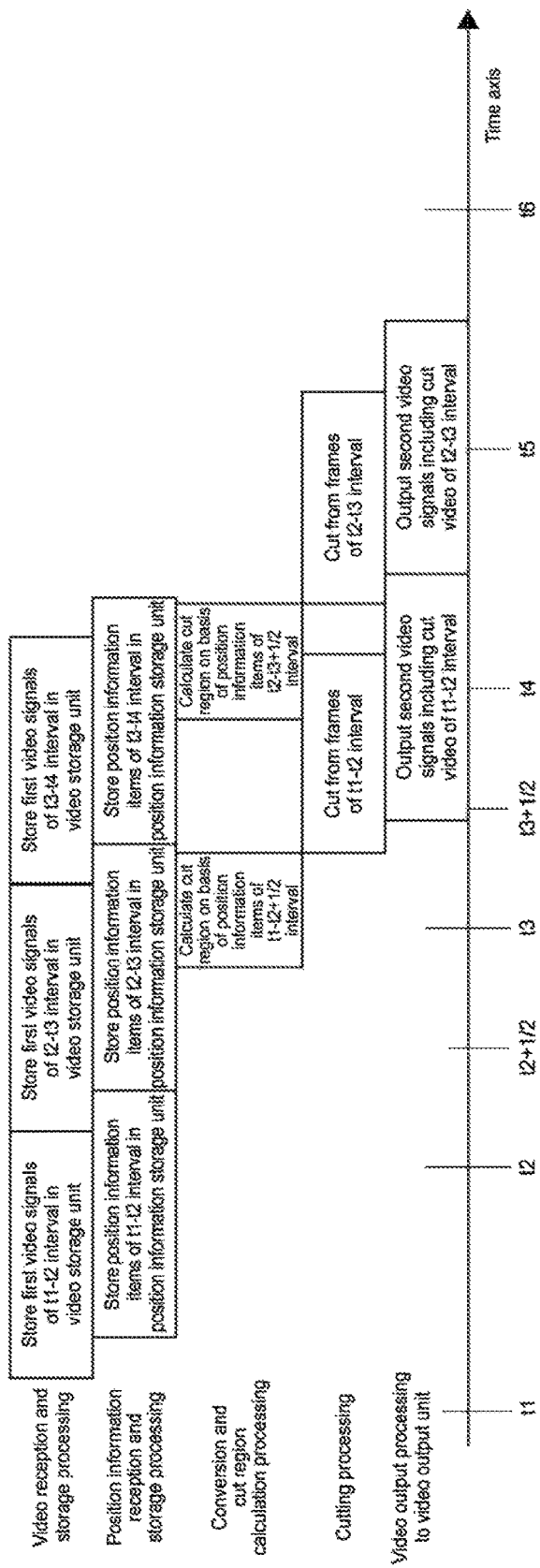
FIG. 21 A timing chart of delay live processing by the video processing apparatus 100A of FIG. 20.

Further, the cut region 14 of the t1-t2 interval may be calculated on the basis of position information items present in the t1-t2 interval and a first half interval of the t2-t3 interval and the cut region 14 of the t2-t3 interval may be calculated on the basis of position information items present in the t2-t3 interval and a first half interval of the t3-t4 interval (see FIG. 21). Alternatively, the cut region 14 of the t1-t2 interval may be calculated on the basis of the position information items of the t1-t2 interval and one or more, a predetermined number of position information items from the head of the t2-t3 interval.

Further, the cut region 14 of the t1-t2 interval may be calculated on the basis of the position information item present in a t1-t (1+n) interval. Where "n" is one or more integers.

[Details of Operation of Delay Live Processing B]

Next, details of an operation of the delay live processing B at this video processing apparatus 100 will be described.

Figure 16:
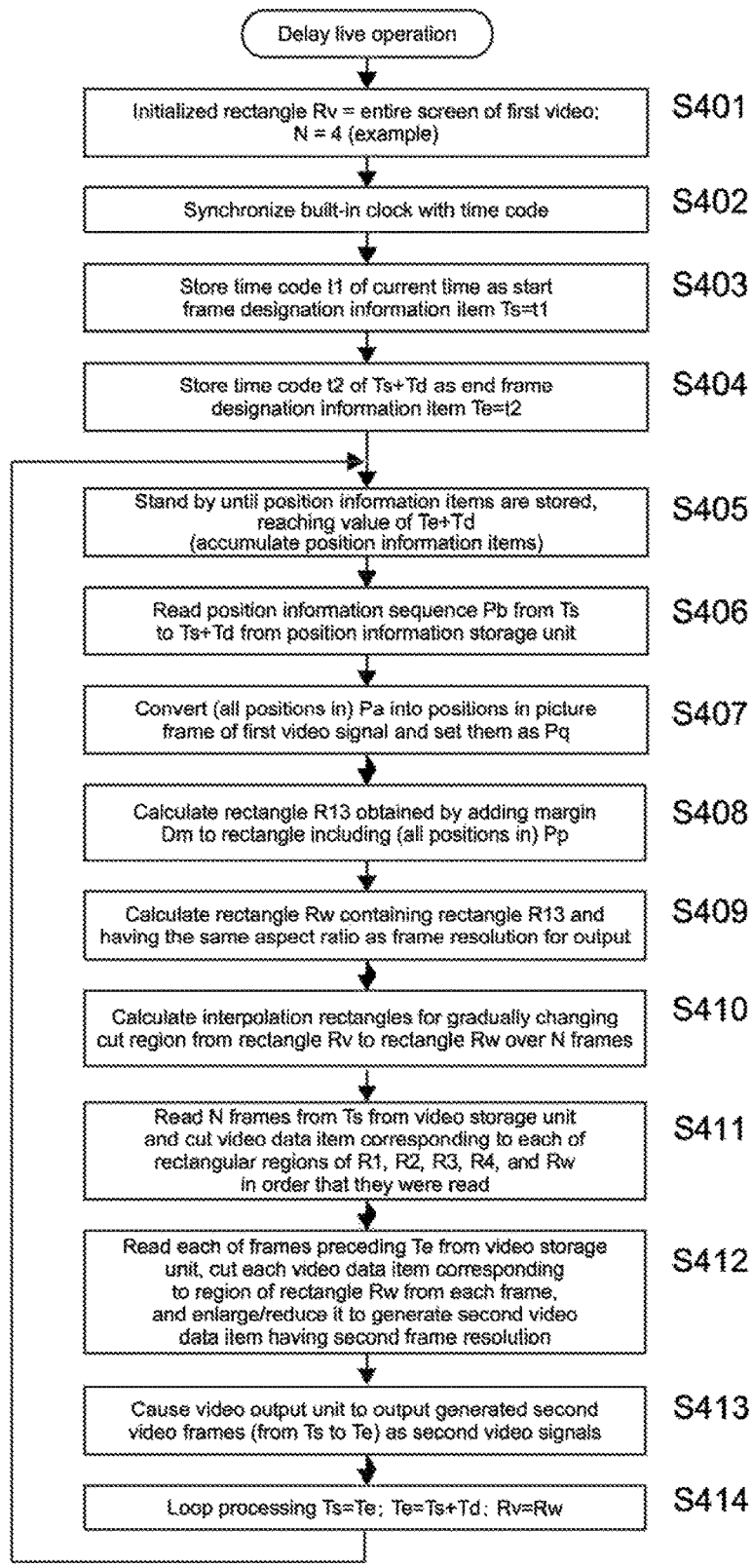
FIG. 16 A flowchart showing a procedure of the delay live processing B.

FIG. 16 is a flowchart showing a procedure of this delay live processing B.

Note that, in the details of the operation of this delay live processing B, processing or the like for reducing discomfort that can be given to the viewer in changing the size of the cut region is newly added.

Reception processing of the first video signal and reception processing of the position information item are the same as those in the above-mentioned video clip generation. Therefore, a description thereof will be omitted here.

First of all, the CPU 131 (cut region calculation unit 106) initializes parameters for repeating operations. The parameters for the repeating operations include a size Rv of the cut region and the number N of interpolation frames that is the number of frames to change the size of the cut region. These parameters are initialized by, for example, setting Rv to have a value of the frame resolution of the entire picture frame 11 of the first video signal and setting N to 4 (Step S401).

Next, the CPU 131 (time providing unit 121 of time interval setting unit 120) synchronizes the time of the built-in clock (real time clock) with the time indicated by the time code added to the first video signal input by the video input unit 101 (Step S402). Note that information on the time may be acquired from the time server over the network 20 through the network interface 138. Alternatively, it may be synchronized with the built-in clock of the camera 1, communicating with the camera 1.

Next, the CPU 131 (time providing unit 121) causes the RAM 133 (designation start time storage unit 107) to store the time code t1 indicating the current time of the built-in clock as the cutting start time Ts (Step S403).

Note that, while the CPU 131 operates in the above-mentioned manner, the first video signal is input into this video processing apparatus 100 from the video input unit 101 by the camera 1 and stored in the RAM 133 (video storage unit 102).

The CPU 131 (time providing unit 121) causes the RAM 133 (designation end time storage unit 108) to store the time code t2 indicating the time of Ts+Td, as the cutting end time Te (Step S404). Here, Td indicates a fixed time interval length for calculating the cut region and is, for example, 5 seconds or 10 seconds.

The CPU 131 (cut region calculation unit 106) stands by until position information items obtained by the time of Te+Td are stored in the RAM 133 (position information storage unit 104) (Step S405).

When the position information items obtained by the time of Te+Td are stored in the RAM 133 (position information storage unit 104), the CPU 131 (cut region calculation unit 106) reads a plurality of positions information items of a time interval from the cutting start time Ts to Te+Td as a position information sequence Pb from the RAM 133 (video storage unit 102) (Step S406). The time interval from Ts to Te+Td is a time interval from the time Ts to the time Te+Td (exclusive of Te+Td).

The CPU 131 (conversion unit 105) converts the respective position information items (position information items of moving object in ground coordination system) in the position information sequence Pb into position information items in the coordination system of the picture frame of the first video signal (Step S407). A sequence of the converted position information items will be referred to as a position information sequence Pq.

The CPU 131 (cut region calculation unit 106) calculates a rectangle including the respective positions indicated by the respective position information items of the position information sequence Pq. The CPU 131 (cut region calculation unit 106) calculates a rectangle R13 obtained by adding the predetermined margin Dm to the calculated rectangle (Step S408).

The CPU 131 (cut region calculation unit 106) calculates a rectangle Rw including the calculated rectangle R13 and having the aspect ratio of the second frame resolution, as the cut region (Step S409).

Next, in order to reduce the discomfort of the viewer with respect to the position of the cut region or a sharp change in size, the CPU 131 (cut region calculation unit 106) calculates an N-number of interpolation rectangles for gradually changing the cut region from the rectangle Rv to the rectangle Rw for (N+1) frames (Step S410).

Figure 17:
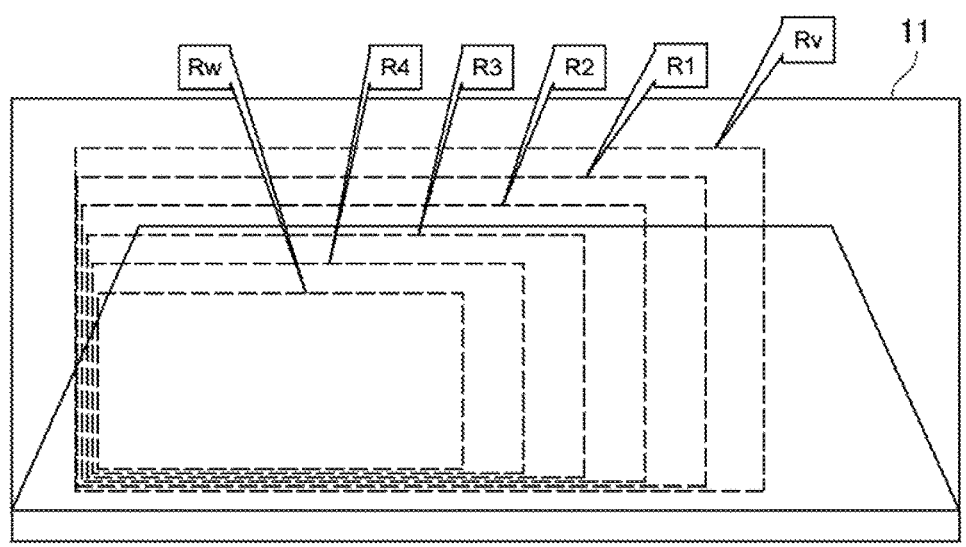
FIG. 17 A diagram showing an example of an N-number of interpolation rectangles of second video signals that are used in changing the cut region.

FIG. 17 is a diagram showing an example of the N-number of interpolation rectangles.

An N-number of rectangles R1, R2, R3, and R4 generated in a temporal order from the rectangle Rv to the rectangle Rw are the interpolation rectangles.

The CPU 131 (cut video generation unit 109) reads an N-number of frames from the cutting start time Ts from the RAM 133 (video storage unit 102) and cuts each video data item by applying the rectangular region in order from the frame of the cutting start time Ts, in the order of R1, R2, R3, R4, and Rw therefrom (Step S411).

Thereafter, the CPU 131 (cut video generation unit 109) reads each of frames obtained by the time Te from the RAM 133 (video storage unit 102) and cuts a video data item corresponding to the region of the rectangle Rw from each of these frames (Step S412).

The CPU 131 (cut video generation unit 109) enlarges (pixel interpolation) or reduces (pixel decimation) each video data item cut from each frame in a manner that depends on needs to have a predetermined frame resolution for output. With this, second video data items having the second frame resolution and including at least the range within which the moving object has moved in the time interval from the time Ts to the time Te can be obtained.

The second video data items made having the second frame resolution are encoded into second video signals and output by the video output unit 110 in the order that they were generated (Step S413).

Finally, for preparation for a next processing cycle, the CPU 131 updates the cutting start time Ts with a value corresponding to a Te frame, updates the cutting start time Te with the value of Ts+Td, and further updates the value of the parameter Rv of the cut region with the value of Rw (Step S414).

Note that, if the frame of the time code which would precisely correspond to the Te time is not present, a time of a closest time code following it is set to Ts.

In the flowchart of FIG. 16 and the description thereof, the second video data items of each time interval are provided to the video output unit 110 after generation for this time interval is completed. However, every time the frame of the second video data item is generated, it may be provided to the video output unit 110. By doing so, the delay time from the input of the first video signal to the output of the second video signal can be reduced.

In the flowchart of FIG. 16 and the description thereof, it is assumed that the respective processing elements are sequentially performed. However, regarding processing elements that can be processed as a pipeline, they may be concurrently performed on data items in the order that they were prepared.

In addition, in the above description, for example, the t1-t2 interval is set to t1 to t2 (exclusive of t2) and the t2-t3 interval is set to t2 to t3 (exclusive of t2). However, the times that are boundaries may be shared with the respective previous or subsequent unit intervals, for example, the t1-t2 interval may be set to t1 to t2 (inclusive of t2) and the t2-t3 interval may be set to t2 to t3 (inclusive of t3).

By the above-mentioned operations, the cut region is calculated by using the position information item coming from the outside with delay in addition to the reception of the first video signal and by efficiently using the time information items. For example, it is possible to efficiently use the detection result and the like of the position of the ball from the sensor in the stadium.

Next, descriptions of modified examples and supplementary descriptions of the video processing apparatus 100 of the above-mentioned embodiment will be made.

Modified Example 1

[Specification of Time Interval Based on Event Information Item]

The CPU 131 of the video processing apparatus 100 of the above-mentioned embodiment may receive an event information item from an external event information generation apparatus and may uniquely set a region including a region corresponding to that event information item in a picture frame of a first video signal, as the cut region.

The event information item includes, for example, information items for notifying the video processing apparatus 100 of a location where a remarkable play such as a corner kick, a penalty kick, and a free kick in the soccer game will take place and the type of a remarkable play. For example, in a case of the corner kick, the CPU 131 of the video processing apparatus 100 is notified of an event information item including, for example, an information item to determine an area including the goal area or the vicinity thereof where a series of plays starting from this corner kick will take place.

Note that the information item to determine this area may be, for example, an ID assigned to each area in a case where the game area 2 is divided into a plurality of areas.

As shown in FIG. 5, the event information item may be, for example, sent to the video processing apparatus 100 from an event information generation apparatus 160 of an external information processing apparatus or the like capable of communicating with the video processing apparatus 100 over the network 20. This event information generation apparatus 160 sends the event information item to the video processing apparatus 100 via the network 20 according to a command from the operator, for example. When receiving this event information item, the CPU 131 of the video processing apparatus 100 sets the region including the region corresponding to the information item of that event, for example, as the cut region.

Further, the CPU 131 receives an information item for instruction regarding an event end from the outside, for example, cancels the above-mentioned setting of the cut region, and returns to an operating mode on which the cut region is calculated on the basis of the position information item of the moving object.

Further, the event information generation apparatus 160 may determine whether a remarkable play will take place, not only according to the command from the operator but also by image recognition of the first video signal or an information item from the sensor, and may send the event information item to the video processing apparatus 100 via the network 20.

Modified Example 2

Figure 18:
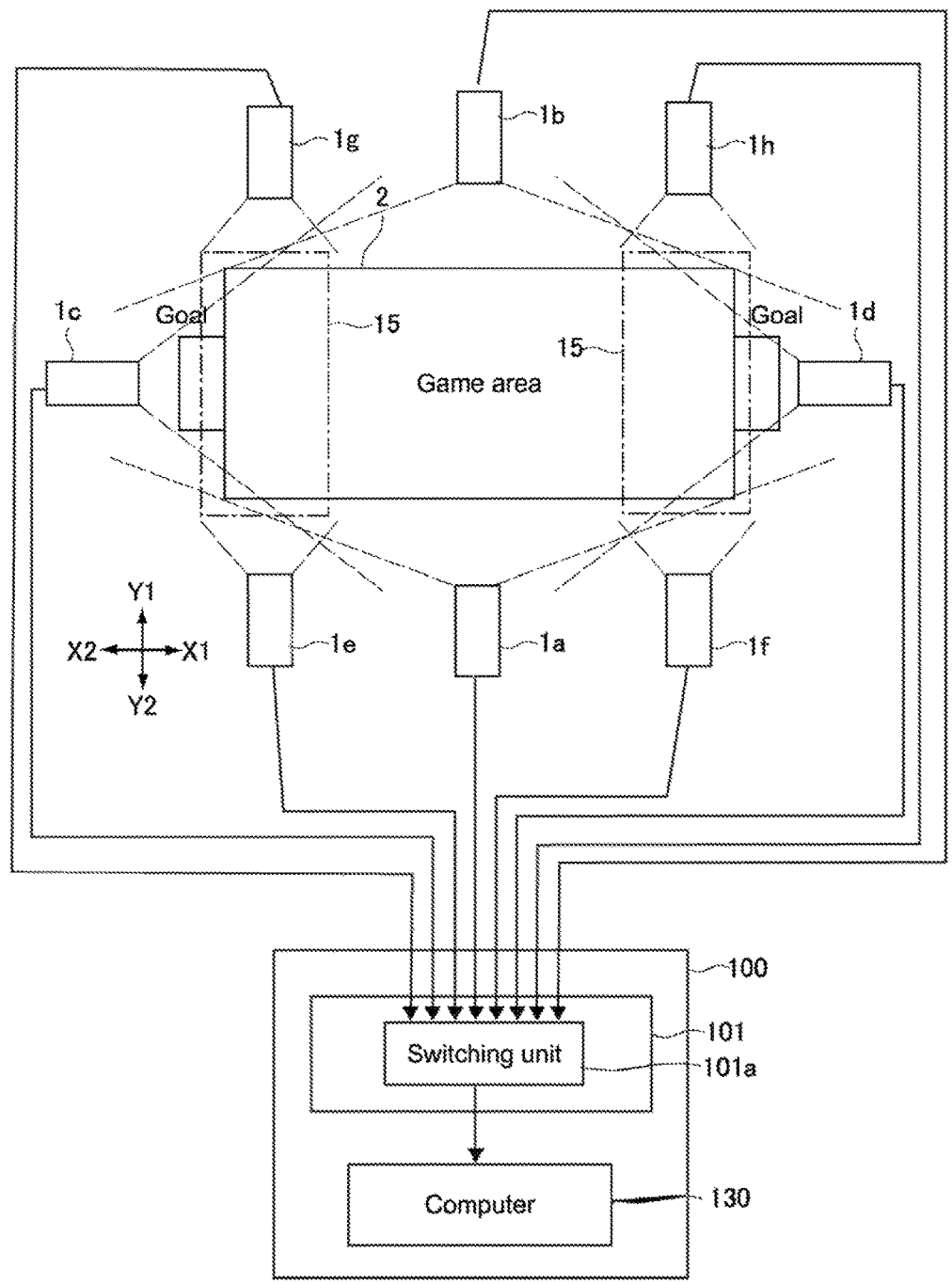
FIG. 18 A diagram describing a video processing system using a plurality of cameras.

[Method Using Plurality of Cameras] FIG. 18 is an example in which a plurality of cameras 1a, 1b, 1c, 1d, 1e, 1f, 1g, and 1h are arranged around the game area 2.

In this example, a total of eight cameras are arranged around the game area 2. The eight cameras include four cameras 1a, 1b, 1c, and 1d for overhead view of the game area 2 in four directions, two cameras 1e and 1g capable of capturing videos of a region near one goal area of the game area 2 in a Y1-direction that is a direction along a short side of the game area 2 and a direction (Y2-direction) opposite thereto, and two cameras 1f and 1h capable of capturing videos of a region near the other goal area of the game area 2 in the Y-direction and the direction (Y2-direction) opposite thereto.

For example, 8K-resolution cameras are used as the cameras 1a, 1b, 1c, and 1d for overhead view and cameras (e.g., HD resolution cameras) having the same resolution as the second frame resolution are used as the cameras 1e, 1f, 1g, and 1h for capturing videos of the goal areas (cameras for a particular region).

Here, operations of the one camera 1a for overhead view and the two cameras 1e and 1f for capturing videos of the goal areas will be assumed. These cameras 1a, 1e, and 1f are arranged outside the game area 2 in a short-side direction (Y2-direction).

The video input unit 101 of the video processing apparatus 100 includes a switching unit 101a that switches channels for inputting video signals from the above-mentioned eight cameras 1a, 1b, 1c, 1d, 1e, 1f, 1g, and 1h according to instructions from the CPU 131. The switching operation is performed at blanking intervals (Vertical blanking interval) of the video signals.

Note that this switching unit 101a for the channels may be replaced by a switching apparatus provided between respective video signal lines between the eight cameras 1a, 1b, 1c, 1d, 1e, 1f, 1g, and 1h and the video input unit 101 of the video processing apparatus 100.

In the RAM 133 in the computer 130 of the video processing apparatus 100, position information items of predetermined regions 15 in the ground coordinate system within the game area 2 are stored. The predetermined regions 15 respectively include the goal areas. The predetermined regions 15 is present within the picture frame of each of the two cameras 1e and 1f for capturing videos of the goal areas. The CPU 131 of the video processing apparatus 100 (cut region calculation unit 106) determines whether or not a condition that the plurality of positions of the moving object in the designated time interval are all contained in the picture frame of either one camera of the two cameras 1e and 1f for capturing videos of the goal areas is satisfied. If this condition is satisfied, the CPU 131 selects a video signal (third video signal) of the one camera for capturing a video of the goal area.

The cameras 1e and 1f for capturing videos of the goal areas are cameras having the same resolution as the second frame resolution, for example, the HD resolution. Therefore, the CPU 131 of the computer 130 provides video data items of the entire picture frames of video signals input from those cameras 1e and if to the video output unit 110 without changing the resolution thereof.

If the above-mentioned condition is not satisfied, the CPU 131 (cut region calculation unit 106) selects a video signal (first video signal) of the camera 1a for overhead view and performs the calculation of the cut region, the cutting of the video data item, and the enlargement/reduction that have been described above.

Therefore, there is a difference in a time taken from the input of the video signal to the output of the second video signal between the case where either one of the cameras 1e and if for capturing videos of the goal areas is selected and the case where the camera 1a for overhead view is selected. In view of this, in a case where either one of the cameras 1e and 1f for capturing videos of the goal areas is selected, the CPU 131 buffers video data items by an amount corresponding to that time difference in the video processing apparatus 100 and provides them to the video output unit 110. With this, second video output when switching between the video signals of the cameras 1e and 1f for capturing videos of the goal areas and the first video signal of the camera 1a for overhead view is performed within the time interval is not interrupted.

Here, whether or not the above-mentioned condition is satisfied is determined on the basis of the position information item from the outside which is input into the position information input unit 103 and the switching between the cameras 1e and 1f for capturing videos of the goal areas and the camera 1a for overhead view is performed. However, the event information item regarding the game may be received from the outside in real time and the switching between the cameras 1e and 1f for capturing videos of the goal areas and the camera 1a for overhead view may be performed in a manner that depends on this event type.

A camera selection method in a case of assuming application of the four cameras 1a, 1b, 1c, and 1d for overhead view is, for example, as follows.

Figure 19:
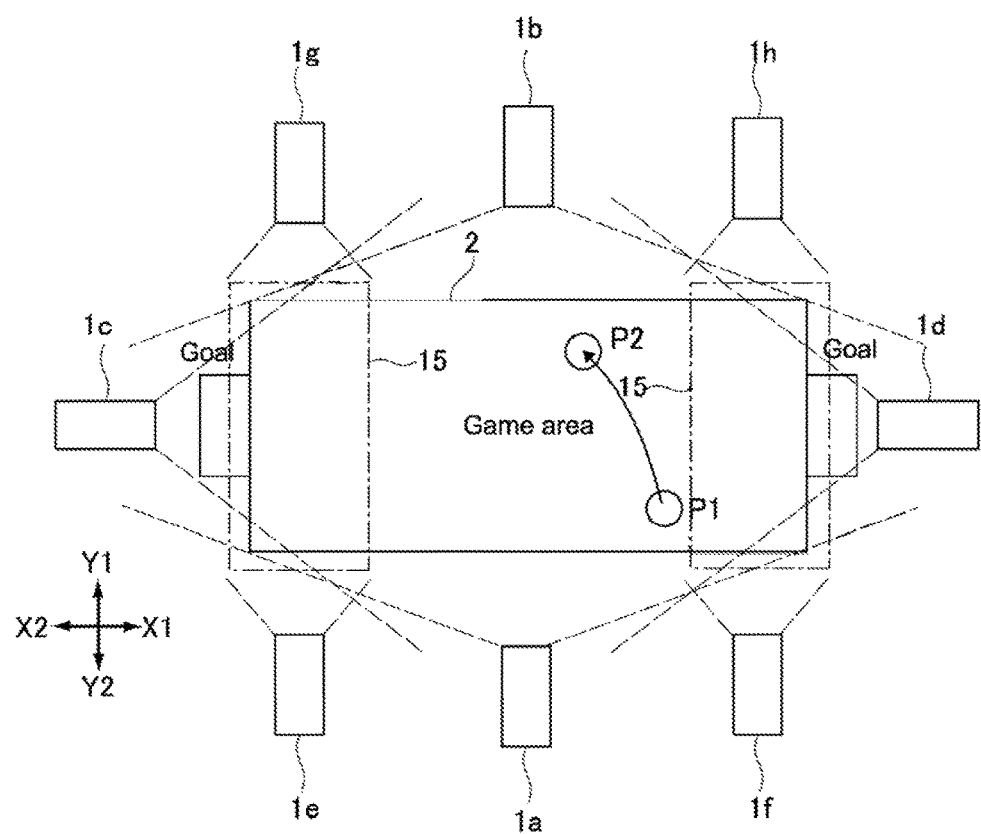
FIG. 19 A diagram describing a switching method for four cameras for overhead view.

The CPU 131 (cut region calculation unit 106) determines a movement direction of the moving object on the basis of the position information sequence. The CPU 131 selects the first video signal of the camera for overhead view which is arranged in a direction of a destination of the moving object. For example, as shown in FIG. 19, it is assumed that the ball 3 has been moved from the position P1 to the position P2 in the designated time interval. In this case, a movement direction of the ball 3 is the Y1-direction. Therefore, the first video signal of the camera 1b for overhead view that captures a video of the game area 2 from a side facing the Y1-direction is selected. The calculation of the cut region, the cutting of the video data item, and the enlargement/reduction are similarly performed on the basis of the selected first video signal and the second video signal is generated.

In addition, also in application in which the four cameras 1e, 1f, 1g, and 1h for capturing videos of the goal areas are added to the four cameras 1a, 1b, 1c, and 1d for overhead view, the video signal of the camera for capturing a video of the goal area, which is arranged in the direction of the destination of the moving object, is similarly selected.

With this, for example, a second video signal including a video data item obtained by mainly capturing a video of a front side of the player 4 in contact with the ball 3 can be obtained.

Note that nine or more cameras may be arranged. Further, cameras that capture videos of the game area 2 obliquely from four corners may be added. Further, cameras having a resolution higher than the second frame resolution may be used as the cameras for capturing videos of the goal areas and a configuration in which cutting is also performed on output videos thereof may be employed.

Even in a case where one or more cameras of the plurality of cameras are PTZ (pan head) operated by a cameraman, this modified example is applied. In this case, the CPU 131 of the video processing apparatus 100 performs conversion between the position information item in the coordinate system within the picture frame of the first video signal and the position information item of the ground coordinate system within the game area 2, considering PTZ information.

Further, a selection command may be communicable according to the cameraman's operation so as to cause the CPU 131 to select a video signal of the camera operated by that cameraman.

Modified Example 3

[Video Processing Apparatus without Conversion Unit]

Figure 20:
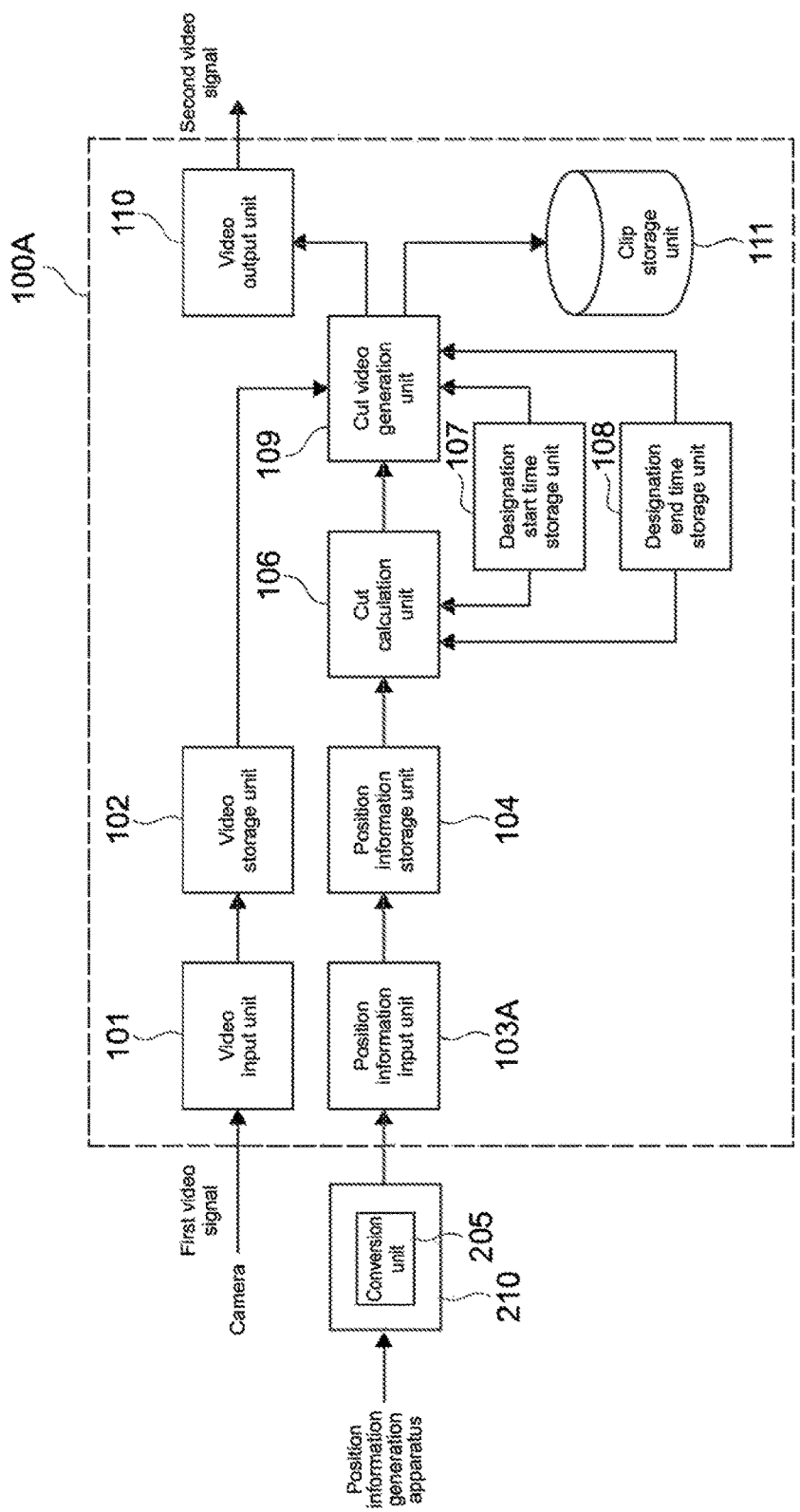
FIG. 20 A block diagram showing a configuration of Modified Example 3 of a video processing apparatus 100A.

FIG. 20 is a block diagram showing a configuration of Modified Example 3 of a video processing apparatus 100A.

The video processing apparatus 100 of the first embodiment includes the conversion unit 105 that converts the position information item of the moving object in the ground coordinate system into the position information item of the coordinate system of the entire picture frame of the first video signal. In contrast, the video processing apparatus 100A of Modified Example 3 is configured such that a position information input unit 103A inputs a position information item, which has been converted into the coordinate system of the entire picture frame of the first video signal from the ground coordinate system of the moving object, from an external apparatus 210 including a conversion unit 205.

The position information item input by the position information input unit 103A is stored in the position information storage unit 104. The cut region calculation unit 106 reads the position information item from the position information storage unit 104 and calculates a cut region on the basis of the read position information item.

Further, the position information item of the moving object can also be detected by analyzing the video data item of the video signal input by the video input unit 101. In this case, the conversion units 105 and 205 can be omitted both inside and outside the video processing apparatus 100.

FIG. 21 is a timing chart of delay live processing in a case where a cut region is calculated on the basis of position information items present in one time interval and a first half of the subsequent time interval and the position information item of the coordinate system of the entire picture frame of the first video signal is input into the video processing apparatus 100A of Modified Example 3 from the outside.

Position information items of the t1-t2 interval are stored in the position information storage unit 104. Subsequently, position information items obtained by a time t2+½ in middle of the t2-t3 interval are stored in the position information storage unit 104. Then, the CPU 131 reads, from the position information storage unit 104, the position information items of the t1-t2 interval and the position information items obtained by the time t2+½ in middle of the t2-t3 interval and calculates a cut region on the basis of these position information items. The CPU 131 cuts a video data item from the frame of the first video signal of the t1-t2 interval using this cut region, enlarges or reduces it to have the second frame resolution, and provides it to the video output unit 110. Similar processing is also performed in the following time intervals.

That is, position information items of the t2-t3 interval are stored in the position information storage unit 104. Subsequently, position information items obtained by a time t3+½ in middle of the t3-t4 interval are stored in the position information storage unit 104. Then, the CPU 131 reads, from the position information storage unit 104, the position information items of the t2-t3 interval and the position information items obtained by the time t3+½ in middle of the t3-t4 interval and calculates a cut region on the basis of these position information items. The CPU 131 cuts a video data item from the frame of the first video signal of the t2-t3 interval using this cut region, cuts a video data item from the frame of the first video signal of the t2-t3 interval, enlarges or reduces it to have the second frame resolution, and provides it to the video output unit 110.

Modified Example 4

[Manual Correction of Position Information Item of Moving Object in Delay Live Processing]

In order to increase the accuracy of the position information item of the moving object, it is desirable to be capable of manually modifying the position of the moving object.

In view of this, the use of a remote computer 150 connected to the video processing apparatus 100 via the network may enable the position information item of the moving object that is generated by the position information generation apparatus 140 to be manually modified.

The remote computer 150 receives the position information item of the moving object generated by the position information generation apparatus 140 from the video processing apparatus 100 via the network 20 and displays it on a monitor as an image in association with a time information item. A person in charge of modification who uses the remote computer 150 checks this image in a location where the event can be seen in real time, for example, and checks whether or not any problem is present in the calculated information of the moving object by, for example, comparing it with the actual game with the eyes. If a problem was found, a modification information item is input from the remote computer 150. The input modification information item is sent to the video processing apparatus 100 from the remote computer 150 via the network 20. The CPU 131 of the video processing apparatus 100 modifies the corresponding one of position information items stored in the position information storage unit 104 on the basis of the received modification information item.

Note that, in a case where a modification system using this remote computer 150 is employed, the delay time in the delay live processing, for example, should be determined considering a time necessary for the artificial modification operation and exchange with the computer 130.

Modified Example 5

[Minimum Size of Cut Region]

For example, if the ball 3 is substantially stationary in the designated time interval, a cut region whose minimum size is limited should be generated. For example, it is favorable that the minimum size of the cut region is a size including the ball 3 and the entire bodies of the players 4 surrounding it. Alternatively, in order to suppress the deterioration of image quality due to enlargement, the minimum size may be determined such that the number of horizontal pixels (resolution) of the cut region becomes, for example, ½ or more of the number of horizontal pixels (resolution) of the second video signal. In view of this, in the video processing apparatus 100, the minimum size of the cut region is limited. If the determined size of the cut region is mathematically smaller than the minimum size, the CPU 131 modifies that size into the prescribed minimum size.

By the way, the object is shown as larger one as it is located closer to the camera 1 and the object is shown as smaller one as it is located farther from the camera 1. Therefore, with the fixed minimum size determined by simply considering an average mean size of a human body, the cut region is excessively large when the ball 3 is located far from the camera 1. On the contrary, the cut region is excessively small when the ball 3 is close to the camera 1. There is a fear that the bodies of the players 4 may not be contained in the cut region, for example.

In order to alleviate this problem, during installation, for example, according to operations, the CPU 131 calculates an optimal minimum size of the cut region for each position of the entire picture frame of the first video signal on the basis of the positional relationship between the game area 2 and the camera in the coordinate system of the entire picture frame of the first video signal and the information items that can be obtained from the PTZ and saves it in the RAM 133. The CPU 131 is applied to the saved optimal minimum size of the cut region at each position and calculates a cut region.

With this, the minimum size of the cut region can be favorably determined and an image including the bodies of the players 4 within the picture frame in a zoomed-in scene, for example, can be obtained.

Modified Example 6

[Correction Method 1 for Cut Region]

The CPU 131 may correct the calculated cut region from another perspective.

For example, there is a method of correcting the cut region from perspective of the number of moving objects to be included in the cut region. Specifically, the CPU 131 may correct the cut region to contain a predetermined number of players 4 of the players 4 located at a predetermined distance or shorter from the ball 3, who are, for example, closest to the ball 3 at least at a moment of the time interval.

For example, the CPU 131 corrects the position and the size of the cut region such that the cut region includes the positions of at least two players 4 closest to the ball 3 at a moment at which three or more players 4 are present within a circle having a diameter of 5 m around the ball 3 in the designated time interval.

Modified Example 7

[Correction Method 2 for Cut Region]

Further, in a case of the soccer game, a method of correcting the cut region such that the positions of the players 4 who have acted on the ball 3 are contained in the cut region is exemplified.

The players 4 who have acted on the ball 3 are, for example, a plurality of players 4 among which the ball 3 has been passed. For example, the CPU 131 determines the players 4 who have come within a distance set in advance or shorter from the position of the ball 3 in the time interval as the players 4 who have acted on the ball 3 and corrects the cut region from the time at which they came to a set time, for example, 3 seconds later to contain the positions of the players 4 who have acted on the ball 3.

Modified Example 8

[Division of Time Interval by Operator]

When the motion of the ball 3 or the player 4 becomes larger and faster in a case where the cut region is calculated at fixed time intervals, the cut region tends to be larger on average and zoomed-out images are mainly generated. In view of this, it is desirable that the time interval can be appropriately changed.

Further, it is favorable that an instruction operation for changing the time interval in the delay live processing is easily performed.

An operator's instruction operation to change the time interval is performed using the operation input unit 135.

The time interval is changed by, for example, equally dividing an initially set time interval according to a division instruction from the operator or returning it according to a division cancelling instruction. For example, an initial time interval is divided to each have a ½ length according to a first division instruction. In addition, the initial time interval is divided to each have a ¼ length according to a next division instruction. When the instruction to restore the time interval is provided from the operator, it returns to the ½ length of the initial time interval. Then, when an instruction to restore the time interval is provided from the operator again, it returns to the initial time interval.

With this, when the motion of the ball 3 or the player 4 becomes larger and faster, the operator can change the time interval between the ½ or ¼ length of the initial time interval and the cut region having a suitable size can be generated.

Modified Example 9

[Generation of Time Interval Designation Trigger Based on Amount of Movement of Moving Object]

The CPU 131 (position information input unit 103) may be configured to generate the trigger for designating the cutting end time when an amount of change in the position information item of the moving object (amount of movement of moving object) exceeds a threshold set in advance after the cutting start time (processing start time as whole or previous cutting end time). With this, for example, the second video signal whose cut region is changed in each time interval in which the ball 3 moves by a distance corresponding to a first threshold can be obtained.

Modified Example 10

The video data item generated by the delay live processing may be not only output by the video output unit 110 but also saved in the storage device 137 for another usage. A coordinate information item of the cut region may also be saved in the storage device 137. The coordinate information item saved in the storage device 137 can be utilized for game analysis afterward, for example.

Modified Example 11

The video data item of the first video signal input from the camera 1 and the video data item generated by the delay live processing may be saved in the storage device 137 in association with each other. By doing so, editing, for example, replacing at least a part of the video data item generated by the delay live processing by the video data item of the cut region manually determined on the basis of the video data item of the first video signal can be performed.

Modified Example 12

The present technology is applicable not only to capturing videos of soccer but also to capturing videos of another game such as basketball and rugby football or a theater.

Modified Example 13

The second video signals generated by this video processing apparatus 100 may be used for remote public viewing.

Modified Example 14

The aspect ratio of the cut region may be variable.

In that case, an output destination of this video processing apparatus 100 is favorably a display unit in which one screen is constituted of a plurality of screens of a plurality of display devices arranged in at least either one of a vertical direction and a horizontal direction, for example. More specifically, a display device having a resolution of the aspect ratio of 32:9 can be configured by arranging two display devices having a resolution of the aspect ratio of 16:9 in the horizontal direction.

Exemplifying a specific example, if a horizontal movement distance of the moving object of the designated time interval is larger than a predetermined value on the basis of the position information sequence of the moving object, the CPU 131 of the video processing apparatus 100 sets the resolution of the cut region to 32:9. If the horizontal movement distance is smaller than the predetermined value, the CPU 131 of the video processing apparatus 100 sets the resolution of the cut region to 16:9. In the latter case, the CPU 131 may be configured to simultaneously output the same video data items having the resolution of 16:9 to the two display devices.

Modified Example 15

If the movement distance of the moving object in the designated time interval is smaller than the predetermined value, the CPU 131 of the video processing apparatus 100 may generate a second video signal with advertisement by mapping a video data item to a partial region having the second frame resolution and mapping another image of an advertisement, for example, to the remaining region.

Further, the processing of generating this second video signal with the advertisement may be disabled when the moving object such as the ball 3 is within the region (e.g., goal area) set in advance. With this, a second video signal excluding the advertisement can be obtained in a case of a remarkable scene.

Modified Example 16

If there is, during a game, an interruption time (e.g., commercial broadcasting time) of broadcasting of that game, the CPU 131 of the video processing apparatus 100 may save the video data item of the first video signal of that interruption time and the video data item generated by the delay live processing in the storage device 137. The CPU 131 may read a video data item of a time interval of the video data items of the interruption time saved in the storage device 137, in which the moving object such as the ball 3 is present within the region (e.g., goal area) set in advance, and may cause the video output unit 110 to output it as the second video signal when receiving a timing at which the broadcasting is re-started, for example.

Alternatively, it may read the video data item of the time interval in which the movement distance of the moving object such as the ball 3 is larger than the value set in advance and cause the video output unit 110 to output it as the second video signal.

In addition, on the basis of the event information item regarding the game that is input from the outside, the CPU 131 may determine the time interval of the video data item read from the video data items of the interruption time that are saved in the storage device 137.

Modified Example 17

The CPU 131 is capable of obtaining a video data item that is a digest of a game by extracting, from the video data item of the first video signal of the entire time that are saved in the storage device 137, only the video data item of an important time interval, and setting it as a cutting processing target.

For example, the important time interval may be determined on the basis of the amount of movement and the position of the moving object such as the ball 3 or may be determined on the basis of the event information item from the outside. The important time interval may be determined on the basis of movement speed of the moving object.

Modified Example 18

The game area 2 such as a soccer stadium is wide. Therefore, in a case where that game area is outdoor, the brightness of the cut region may greatly differ between a location where sunlight shines on it directly and a location where sunlight does not shine on it directly. In such a case, the CPU 131 may correct images such that the respective cut regions have equal or closer image-quality condition such as an image luminance average value in the cut region.

Modified Example 19

In a case where the first video signal that can be obtained from the camera 1 is an HDR (high dynamic range) image having a dynamic range wider than the second video signal output from the video processing apparatus 100, the CPU 131 may convert the video data item, which is obtained by cutting, to narrow the dynamic range such that it becomes optimal within that picture frame.

Modified Example 20

The video data item obtained by this video processing apparatus 100 may be displayed on the display device in the stadium. For example, when a remarkable action such as a goal scene took place, the operator may manually start playback.

Modified Example 21

In the delay live processing, due to malfunction of the moving object passage sensor 6, difficulty of the image recognition, or the like, it is conceivable that the position information item of the moving object cannot be obtained within an expected delay time. In this case, the CPU 131 may perform control to prevent delay live broadcasting from being obstructed, by skipping the processing such as the calculation of the cut region and making the cut region into the entire picture frame of the original input video signal.

Modified Example 22

The interpolation processing in changing the cut region may be performed only in a case of zoom-in.

Modified Example 23

In order to reduce the discomfort for the viewer due to a sharp change in size of the cut region, if the cut region is equal to or smaller than a predetermined size, the CPU 131 may limit a reduction rate from the size before change or increase the number of interpolations in changing the cut region.

Modified Example 24

The CPU 131 may be set not to change the cut region if all positions of a plurality of moving objects of the subsequent time interval that are used for calculating a subsequent cut region are in the current cut region and the position of one of them is away from an end by a predetermined distance or longer (that is, located closer to a center inside the picture frame by that distance or longer). With this, it is possible to avoid an image hard to see due to a change in the cut region in a case where the amount of movement of the moving object is small between consecutive time intervals and to omit unnecessary calculation processing of the cut region.

Modified Example 25

The values used as the time code and the time may be replaced by, for example, a counter that generates equivalent time information items or a pointer to video frame data items.

Modified Example 26

The operator can arbitrarily set setting values such as various thresholds used in the processing at the video processing apparatus 100 by the use of the operation input unit 135 and the display 136.

Modified Example 27

The video signal input into the video processing apparatus 100 may be a video signal of one image obtained by combining images taken with a plurality of cameras.

Modified Example 28

This video processing apparatus 100 can be incorporated in the camera 1. Further, this video processing apparatus 100 can be incorporated in a domestic recorder that receives and accumulates broadcast high-resolution videos as they are.

Modified Example 29

The xy-coordinates are used as the position information item. By using three-dimensional coordinates obtained by adding a z-coordinate thereto, the cut region can be calculated with higher accuracy.

It should be noted that the present technology may also take the following configurations.

(1) A video processing apparatus, including:
a video input unit that inputs a first video signal captured at a first frame resolution by a camera, to which a time data item of each frame has been added;
a video storage unit that stores a first video data item of each frame included in the input first video signal in association with the time data item;
a position information input unit that receives a position information item of a particular moving object included in the first video signal as a part of a subject;
a position information storage unit that stores the received position information item in association with a time;
a designation start time storage unit that stores a time that specifies a start of a time interval;
a designation end time storage unit that stores a time that specifies an end of the time interval; and
a controller that reads, from the position information storage unit, one or more position information items for each time interval specified by the designation start time storage unit and the designation end time storage unit, calculates a cut region including one or more positions respectively indicated by the one or more read position information items, cuts a video data item of the cut region from the first video data item of the time interval which has been stored in the video storage unit, and generates a second video data item having a second frame resolution from the cut video data item.

(2) The video processing apparatus according to (1), in which
the controller is configured to calculate the cut region having an aspect ratio of the second frame resolution.

(3) The video processing apparatus according to (1) or (2), further including
a video output unit that outputs the second video signal including the generated second video data item at the same frame rate as the first video signal.

(4) The video processing apparatus according to any one of (1) to (3), in which
the controller is configured to calculate the cut region including a plurality of positions respectively indicated by the one or more position information items of the one time interval and one or more position information items of a subsequent time interval, the one or more position information items of the subsequent time interval being at least closer to a head of the subsequent time interval.

(5) The video processing apparatus according to any one of (1) to (4), further including
an operation input unit that receives, from an operator, an instruction to change the time interval, in which
the controller is configured to change the time interval in accordance with the instruction received by the operation input unit.

(6) The video processing apparatus according to any one of (1) to (5), in which
the controller is configured to skip, if a position of positions of the moving object of a subsequent time interval that are used for calculating a subsequent cut region, which is closest to an end of a current cut region, is located inside the current cut region by a predetermined distance or longer from the end of the current cut region, calculation of the cut region and validate the current cut region.

(7) The video processing apparatus according to any one of (1) to (6), in which
the controller is configured to receive, from an outside, an event information item including information that specifies a location of the object and set a region including the location specified by the event information item in a picture frame of the first video signal, as the cut region.

(8) The video processing apparatus according to any one of (1) to (7), in which
the video input unit includes
a switching unit that selects one of a plurality of first video signals respectively captured by a plurality of cameras that captures videos of a common subject in different directions and having a first frame resolution, to which a time data item of each frame has been added, and
the controller is configured to read, from the position information storage unit, at least the one or more position information items of the one time interval, determines a movement direction of the moving object on the basis of one or more positions respectively indicated by the one or more read position information items, and causes the switching unit to select a first video signal of the one camera whose capturing direction is opposed or approximately opposed to the determined movement direction of the moving object.

(9) The video processing apparatus according to (8), in which
the switching unit of the video input unit is configured to be capable of selecting one of the plurality of first video signals and a third video signal captured by one or more cameras for capturing videos of a region that capture videos of a particular region of the object at the second frame resolution, to which a time data item of each frame has been added, and
the controller is configured to cause the switching unit to select the third video signal of the camera for capturing a video of the region if a cut region calculated on the basis of one or more positions respectively indicated by one or more position information items read from the position information storage unit includes the particular region.

(10) A video processing system, including:
at least one camera that performs fixed-point shooting on a subject including a moving object at a first frame resolution and outputs a first video signal to which a time data item of each frame has been added;
a position information generation apparatus that generates a position information item of the moving object; and
a video processing apparatus including
a video input unit that inputs the first video signal,
a video storage unit that stores a first video data item of each frame included in the input first video signal in association with the time data item,
a position information input unit that receives the position information item generated by the position information generation apparatus,
a position information storage unit that stores the received position information item in association with a time,
a designation start time storage unit that stores a time that specifies a start of a time interval,
a designation end time storage unit that stores a time that specifies an end of the time interval, and
a controller that reads, from the position information storage unit, one or more position information items for each time interval specified by the designation start time storage unit and the designation end time storage unit, calculates a cut region including one or more positions respectively indicated by the one or more read position information items, cuts a video data item of the cut region from the first video data item of the time interval which has been stored in the video storage unit, and generates a second video data item having a second frame resolution from the cut video data item.

(11) The video processing system according to (10), in which
the cameras are respectively arranged to capture videos of the common subject in different directions,
the video input unit of the video processing apparatus includes a switching unit that selects one of a plurality of first video signals respectively captured by the plurality of cameras, and
the controller is configured to determine a movement direction of the moving object on the basis of one or more positions respectively indicated by the one or more position information items read from the position information storage unit and cause the switching unit to select the first video signal of the one camera whose capturing direction is opposed or approximately opposed to the determined movement direction of the moving object.

(12) The video processing system according to (10) or (11), further including
a camera for a particular region that captures a video of a particular region of the subject at the second frame resolution and sends a third video signal in association with a time data item, in which
the switching unit is configured to be capable of selecting one video signal from the first video signal and the third video signal, and
the controller is configured to cause the switching unit to select any one of the one or more third video signals if the cut region calculated on the basis of one or more positions respectively indicated by the one or more position information items read from the position information storage unit includes the particular region.

(13) A video processing method, including:
inputting a first video signal captured at a first frame resolution by a camera, to which a time data item of each frame has been added;
storing, in a video storage unit, a first video data item of each frame included in the input first video signal in association with the time data item;
receiving a position information item of a particular moving object included in the first video signal as a part of a subject;
storing, in a position information storage unit, the acquired position information item in association with a time; and
reading, by a controller, from the position information storage unit, one or more position information items for at least each particular time interval, calculating a cut region including one or more positions respectively indicated by the one or more read position information items, cutting a video data item of the cut region from the first video data item of the time interval which has been stored in the video storage unit, and generating a second video data item having a second frame resolution from the cut video data item.

(14) The video processing method according to (13), further including
calculating, by the controller, the cut region having an aspect ratio of the second frame resolution.

(15) The video processing method according to (13) or (14), further including
outputting, by a video output unit, the second video signal including the generated second video data item at the same frame rate as the first video signal.

(16) A video processing apparatus, including:
a video input unit that inputs a first video signal captured at a first frame resolution by a camera, to which a time data item of each frame has been added;

a video storage unit that stores a first video data item of each frame included in the input first video signal in association with the time data item;

a position information input unit that receives a position information item with a time data item of a particular moving object included in the first video signal as a part of a subject;

a position information storage unit that stores the received position information item in association with a time; and a controller that reads, from the position information storage unit, one or more position information items for at least a particular time interval, calculates a cut region including one or more positions respectively indicated by the one or more read position information items, cuts a video data item of the cut region from the first video data item of the time interval which has been stored in the video storage unit, and generates a second video data item having a second frame resolution from the cut video data item.

(17) The video processing apparatus according to (16), in which the controller is configured to calculate the cut region having an aspect ratio of the second frame resolution.

(18) The video processing apparatus according to (16), further including a video output unit that outputs the second video signal including the generated second video data item at the same frame rate as the first video signal.

(19) The video processing apparatus according to any one of (16) to (18), in which the controller is configured to calculate the cut region including a plurality of positions respectively indicated by the one or more position information items of the one time interval and one or more position information items of a subsequent time interval, the one or more position information items being at least closer to a head.

(20) The video processing apparatus according to any one of (16) to (19), further including an operation input unit that receives, from an operator, an instruction to change the time interval, in which the controller is configured to change the time interval in accordance with the instruction received by the operation input unit.

REFERENCE SIGNS LIST

1 . . . camera
10 . . . video processing system
100 . . . video processing apparatus
101 . . . video input unit
101a . . . switching unit
102 . . . video storage unit
103 . . . position information input unit
104 . . . position information storage unit
106 . . . cut region calculation unit
109 . . . cut video generation unit
110 . . . cut video output unit
130 . . . computer
135 . . . operation input unit
136 . . . display
140 . . . position information generation apparatus

The invention claimed is:

1. A video processing apparatus, comprising:
a memory; and
a central processing unit (CPU) configured to:
input a first video signal captured at a first frame resolution by at least one camera,
wherein the first video signal comprises a time data item for each frame of the first video signal;
store, in the memory, a first video data item of the each frame included in the first video signal in association with the time data item of the each frame;
receive at least one position information item of a plurality of position information items, wherein the at least one position information item is associated with a particular moving object included in the first video signal as a part of a subject;
store, in the memory, the at least one position information item in association with a time value;
store, in the memory, the at least one position information item in association with a first time that specifies a start of a time interval;
store, in the memory, the at least one position information item in association with a second time that specifies an end of the time interval;
read, from the memory, the at least one position information item for each of the start of the time interval and the end of the time interval;
calculate a cut region of the first video data item including a plurality of positions respectively,
wherein the plurality of positions is associated with the plurality of position information items of one time interval and the at least one position information item of a subsequent time interval, and the at least one position information item of the subsequent time interval is at least closer to a head of the subsequent time interval;
cut a video data item of the cut region from the first video data item of the one time interval; and
generate a second video data item that includes a second frame resolution from the cut video data item.

2. The video processing apparatus according to claim 1, wherein the cut region
has the second frame resolution.

3. The video processing apparatus according to claim 2, wherein the CPU is further configured to output a second video signal including the generated second video data item at a same frame rate as the first video signal.

4. The video processing apparatus according to claim 3, wherein the CPU is further configured to:
receive, from an operator, an instruction to change the time interval; and
change the time interval based on the instruction.

5. The video processing apparatus according to claim 4, wherein the CPU is further configured to:
skip calculation of the cut region based on a position of the particular moving object of the subsequent time interval;
calculate a subsequent cut region based on the subsequent time interval,
wherein the subsequent cut region is inside a current cut region by a specific distance, the specific distance is calculated from an end of the current cut region, and the subsequent cut region is closest to the end of the current cut region; and
validate the current cut region.

6. The video processing apparatus according to claim 5, wherein the CPU is further configured to:
receive an event information item including information that specifies a location of the particular moving object; and set a region including the location specified by the event information item in a picture frame of the first video signal, as the cut region.

7. The video processing apparatus according to claim 1, wherein the CPU is further configured to:
select one of a plurality of first video signals respectively captured by a plurality of cameras,
wherein the plurality of cameras captures videos of a common subject in different directions and includes a first frame resolution to which the time data item has been added for each frame;
read the at least one position information item of the one time interval;
determine a movement direction of the particular moving object based on at least one position indicated by the at least one position information item; and
select the first video signal of the at least one camera whose capturing direction is opposite to the determined movement direction of the particular moving object.

8. The video processing apparatus according to claim 7, wherein the CPU is further configured to:
select one of the plurality of first video signals and a third video signal captured by the plurality of cameras to capture videos of a particular region of the particular moving object at the second frame resolution,
wherein the time data item is added to the one of the plurality of first video signals and the third video signal for the each frame; and
select the third video signal to capture a video of the particular region based on the cut region,
wherein the cut region is calculated based on the at least one position indicated by the at least one position information item.

9. A video processing system, comprising:
a plurality of cameras configured to:
shoot a subject including a moving object at a first frame resolution; and
output a first video signal to which a time data item of each frame has been added;
a memory; and
a central processing unit (CPU) configured to:
generate at least one position information item of a plurality of position information items of the moving object; and
input the first video signal;
store, in the memory, a first video data item of the each frame included in the first video signal in association with the time data item of the each frame;
receive the at least one position information item of the plurality of position information items of the moving object included in the first video signal as a part of the subject;
store, in the memory, the at least one position information item in association with a time value;
store, in the memory, the at least one position information item in association with a first time that specifies a start of a time interval;
store, in the memory, the at least one position information item in association with a second time that specifies an end of the time interval; and
read, from the memory, the at least one position information item for each of the start of the time interval and the end of the time interval; and
calculate a cut region of the first video data item including a plurality of positions respectively,
wherein the plurality of positions is associated with the plurality of position information items of one time interval and the at least one position information item of a subsequent time interval, and the at least one position information item of the subsequent time interval is at least closer to a head of the subsequent time interval,
cut a video data item of the cut region from the first video data item of the one time interval; and
generate a second video data item that includes a second frame resolution from the cut video data item.

10. The video processing system according to claim 9, wherein
the plurality of cameras are configured to capture videos of a common subject in different directions, and
the CPU is further configured to:
select one of a plurality of first video signals; and
determine a movement direction of the moving object based on the plurality of position information items; and
select the first video signal of at least one first camera of the plurality of cameras whose capturing direction is opposite to the determined movement direction of the moving object.

11. The video processing system according to claim 10, further includes at least one second camera of the plurality of cameras for a particular region,
wherein the at least one second camera is configured to:
capture a video of the particular region at the second frame resolution;
transmit a third video signal in association with the time data item of each frame;
select one video signal from the first video signal and the third video signal;
calculate the cut region based on a plurality of position information items; and
select the third video signal based on the cut region.

12. A video processing method, comprising:
inputting a first video signal captured at a first frame resolution by a camera,
wherein the first video signal comprises a time data item for each frame of the first video signal;
storing, in a memory, a first video data item of the each frame included in the first video signal in association with the time data item of the each frame;
receiving at least one position information item of a plurality of position information items, wherein the at least one position information item is associated with a particular moving object included in the first video signal as a part of a subject;
storing, in the memory, the at least one position information item in association with a time value; and
reading, by a controller, the at least one position information item for at least each particular time interval;
calculating a cut region of the first video data item including a plurality of positions respectively,
wherein the plurality of positions is associated with the plurality of position information items of one time interval and the at least one position information item of a subsequent time interval, and the at least one position information item of a subsequent time interval is at least closer to a head of the subsequent time interval;
cutting a video data item of the cut region from the first video data item of the one time interval; and
generating a second video data item that includes a second frame resolution from the cut video data item.

13. The video processing method according to claim 12, wherein the cut region has the second frame resolution.

14. The video processing method according to claim 13, further comprising outputting the generated second video data item at a same frame rate as the first video signal.

15. A video processing apparatus, comprising:
a memory; and
a central processing unit (CPU) configured to:
   input a first video signal captured at a first frame resolution by a camera,
      wherein the first video signal comprises a time data item for each frame of the first video signal;
   store, in the memory, a first video data item of the each frame included in the first video signal in association with the time data item of the each frame;
   receive a position information item with a time data item of a particular moving object included in the first video signal as a part of a subject;
   store, in the memory, the position information item in association with a time value;
   read, from the memory, the position information item for at least a particular time interval,
   calculate a cut region of the first video data item including a plurality of positions respectively,
      wherein the plurality of positions is associated with the position information item of one time interval and the one position information item of a subsequent time interval, and the position information item of the subsequent time interval is at least closer to a head of the subsequent time interval;
   cut a video data item of the cut region from the first video data item of the one time interval; and
   generate a second video data item that includes a second frame resolution from the cut video data item.

16. The video processing apparatus according to claim 15, wherein the cut region has the second frame resolution.

17. The video processing apparatus according to claim 16, wherein the CPU is further configured to output the generated second video data item at a same frame rate as the first video signal.

18. The video processing apparatus according to claim 17, wherein the CPU is further configured to:
   receive, from an operator, an instruction to change the particular time interval; and
   change the time interval based on the instruction.

* * * * *